(12) United States Patent
Ueno et al.

(10) Patent No.: US 12,540,159 B2
(45) Date of Patent: Feb. 3, 2026

(54) PRODUCTION OF PROTEIN SOLID MATERIAL

(71) Applicant: Institute of Science Tokyo, Tokyo (JP)

(72) Inventors: Takafumi Ueno, Tokyo (JP); Satoshi Abe, Tokyo (JP); Mariko Kojima, Tokyo (JP)

(73) Assignee: Institute of Science Tokyo, Tokyo (JP)

( * ) Notice: Subject to any disclaimer, the term of this patent is extended or adjusted under 35 U.S.C. 154(b) by 1005 days.

(21) Appl. No.: 17/632,739

(22) PCT Filed: Aug. 6, 2020

(86) PCT No.: PCT/JP2020/030226
§ 371 (c)(1),
(2) Date: Feb. 3, 2022

(87) PCT Pub. No.: WO2021/025126
PCT Pub. Date: Feb. 11, 2021

(65) Prior Publication Data
US 2022/0275023 A1    Sep. 1, 2022

(30) Foreign Application Priority Data

Aug. 7, 2019  (JP) ................. 2019-145456

(51) Int. Cl.
| | | |
|---|---|---|
| *C07K 1/30* | (2006.01) | |
| *C07K 1/02* | (2006.01) | |
| *C12N 9/50* | (2006.01) | |
| *C12N 15/62* | (2006.01) | |
| *C12P 21/02* | (2006.01) | |
| *C30B 29/58* | (2006.01) | |

(52) U.S. Cl.
CPC ............. *C07K 1/306* (2013.01); *C07K 1/02* (2013.01); *C12N 15/62* (2013.01); *C12P 21/02* (2013.01); *C07K 2299/00* (2013.01)

(58) Field of Classification Search
None
See application file for complete search history.

(56) References Cited

FOREIGN PATENT DOCUMENTS

| | | | |
|---|---|---|---|
| JP | 2003319778 | * | 11/2003 |
| JP | 2003319778 A | | 11/2003 |
| JP | 2015159731 | * | 9/2015 |
| JP | 2018033404 A | | 3/2018 |
| WO | 2016011501 A1 | | 1/2016 |

OTHER PUBLICATIONS

Hiroshi Ijiri et al., "Structure-based targeting of bioactive proteins into cypovirus polyhedra and application to immobilized cytokines for mammalian cell culture," Biomaterials. 2009; 30: 4297-4308.
International Search Report for International Application No. PCT/JP2020/030226 mailed on Oct. 20, 2020 (5 pages).
Yoshihiro Shimizu et al., "Cell-free translation reconstituted with purified components," Nature Biotech. 2001; 19: 751-755.
Abe et al., "Cell-free protein crystallization for nanocrystal structure determination," Scientific Reports. 2022; 12(16031): 11 pages.
Ikeda et al., "Immobilization of diverse foreign proteins in viral polyhedra and potential application for protein microarrays," Proteomics, Wiley-Vch Verlag, Weinheim, DE. 2006; 6(1):54-66.
Search Report from European Patent Application No. 20850581.8, mailed on Jul. 10, 2023 (14 pages).

\* cited by examiner

*Primary Examiner* — Manjunath N Rao
*Assistant Examiner* — Jae W Lee
(74) *Attorney, Agent, or Firm* — KNOBBE, MARTENS, OLSON & BEAR, LLP

(57) ABSTRACT

This method for producing a protein crystal includes: a step (a) for adding, to a protein synthesis system, a nucleic acid that encodes crystalline protein; and a step (b) for incubating the protein synthesis system during the predetermined time until the crystalline protein encoded by the added nucleic acid is expressed and the expressed crystalline protein completes the formation of crystals, wherein the protein synthesis system is a cell-free protein synthesis system.

5 Claims, 23 Drawing Sheets

Specification includes a Sequence Listing.

15°C

20°C

ΔL1-CLN-1

ΔL1-CLN-2

ΔL1-CLN-3

ΔL1-CLN-f / ΔL1-CLN-r

Cry3A, 20°C

Cry3A, 4°C uNS, 20°C uNS, 4°C

TbCatB, 20°C

TbCatB, 4°C

CipA, 20°C

SEQUENCE LISTING

```
<160> NUMBER OF SEQ ID NOS: 24

<210> SEQ ID NO 1
<211> LENGTH: 248
<212> TYPE: PRT
<213> ORGANISM: Bombyx mori cytoplasmic polyhedrosis virus

<400> SEQUENCE: 1

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
            20                  25                  30

Gly Glu Val Ser Val Trp Val Tyr Ala Tyr Tyr Ser Asp Gly Ser Val
        35                  40                  45

Leu Val Ile Asn Lys Asn Ser Gln Tyr Lys Val Gly Ile Ser Glu Thr
    50                  55                  60

Phe Lys Ala Leu Lys Glu Tyr Arg Glu Gly Gln His Asn Asp Ser Tyr
65                  70                  75                  80

Asp Glu Tyr Glu Val Asn Gln Ser Ile Tyr Tyr Pro Asn Gly Gly Asp
                85                  90                  95

Ala Arg Lys Phe His Ser Asn Ala Lys Pro Arg Ala Ile Gln Ile Ile
            100                 105                 110

Phe Ser Pro Ser Val Asn Val Arg Thr Ile Lys Met Ala Lys Gly Asn
        115                 120                 125

Ala Val Ser Val Pro Asp Glu Tyr Leu Gln Arg Ser His Pro Trp Glu
    130                 135                 140

Ala Thr Gly Ile Lys Tyr Arg Lys Ile Lys Arg Asp Gly Glu Ile Val
145                 150                 155                 160

Gly Tyr Ser His Tyr Phe Glu Leu Pro His Glu Tyr Asn Ser Ile Ser
                165                 170                 175
```

```
Leu Ala Val Ser Gly Val His Lys Asn Pro Ser Ser Tyr Asn Val Gly
            180                 185                 190

Ser Ala His Asn Val Met Asp Val Phe Gln Ser Cys Asp Leu Ala Leu
        195                 200                 205

Arg Phe Cys Asn Arg Tyr Trp Ala Glu Leu Glu Leu Val Asn His Tyr
210                 215                 220

Ile Ser Pro Asn Ala Tyr Pro Tyr Leu Asp Ile Asn Asn His Ser Tyr
225                 230                 235                 240

Gly Val Ala Leu Ser Asn Arg Gln
            245

<210> SEQ ID NO 2
<211> LENGTH: 245
<212> TYPE: PRT
<213> ORGANISM: Autographa californica nucleopolyhedrovirus

<400> SEQUENCE: 2

Met Pro Asp Tyr Ser Tyr Arg Pro Thr Ile Gly Arg Thr Tyr Val Tyr
1               5                   10                  15

Asp Asn Lys Tyr Tyr Lys Asn Leu Asp Ala Val Ile Lys Asn Ala Lys
            20                  25                  30

Arg Lys Lys His Phe Ala Glu His Glu Ile Glu Glu Ala Thr Leu Asp
        35                  40                  45

Pro Leu Asp Asn Tyr Leu Val Ala Glu Asp Pro Phe Leu Gly Pro Gly
    50                  55                  60

Lys Asn Gln Lys Leu Thr Leu Phe Lys Glu Ile Arg Asn Val Lys Pro
65                  70                  75                  80

Asp Thr Met Lys Leu Val Val Gly Trp Lys Gly Lys Glu Phe Tyr Arg
                85                  90                  95

Glu Thr Trp Thr Arg Phe Met Glu Asp Ser Phe Pro Ile Val Asn Asp
            100                 105                 110

Gln Glu Val Met Asp Val Phe Leu Val Val Asn Met Arg Pro Thr Arg
        115                 120                 125

Pro Asn Arg Cys Tyr Lys Phe Leu Ala Gln His Ala Leu Arg Cys Asp
    130                 135                 140

Pro Asp Tyr Val Pro His Asp Val Ile Arg Ile Val Glu Pro Ser Trp
145                 150                 155                 160

Val Gly Ser Asn Asn Glu Tyr Arg Ile Ser Leu Ala Lys Lys Gly Gly
                165                 170                 175

Gly Cys Pro Ile Met Asn Leu His Ser Glu Tyr Thr Asn Ser Phe Glu
            180                 185                 190

Gln Phe Ile Asp Arg Val Ile Trp Glu Asn Phe Tyr Lys Pro Ile Val
        195                 200                 205

Tyr Ile Gly Thr Asp Ser Ala Glu Glu Glu Ile Leu Leu Glu Val
    210                 215                 220

Ser Leu Val Phe Lys Val Lys Glu Phe Ala Pro Asp Ala Pro Leu Phe
225                 230                 235                 240

Thr Gly Pro Ala Tyr
            245

<210> SEQ ID NO 3
<211> LENGTH: 210
<212> TYPE: PRT
<213> ORGANISM: Artificial Sequence
<220> FEATURE:
<223> OTHER INFORMATION: derived from Bombyx mori cytoplasmic
``` polyhedrosis virus

<400> SEQUENCE: 3

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
            20                  25                  30

Gly Glu Val Ser Val Trp Val Tyr Ala Tyr Tyr Ser Asp Gly Ser Val
        35                  40                  45

Leu Val Ile Asn Lys Asn Ser Gln Tyr Lys Val Gly Ile Ser Glu Thr
    50                  55                  60

Phe Lys Lys Pro Arg Ala Ile Gln Ile Ile Phe Ser Pro Ser Val Asn
65                  70                  75                  80

Val Arg Thr Ile Lys Met Ala Lys Gly Asn Ala Val Ser Val Pro Asp
                85                  90                  95

Glu Tyr Leu Gln Arg Ser His Pro Trp Glu Ala Thr Gly Ile Lys Tyr
            100                 105                 110

Arg Lys Ile Lys Arg Asp Gly Glu Ile Val Gly Tyr Ser His Tyr Phe
        115                 120                 125

Glu Leu Pro His Glu Tyr Asn Ser Ile Ser Leu Ala Val Ser Gly Val
    130                 135                 140

His Lys Asn Pro Ser Ser Tyr Asn Val Gly Ser Ala His Asn Val Met
145                 150                 155                 160

Asp Val Phe Gln Ser Cys Asp Leu Ala Leu Arg Phe Cys Asn Arg Tyr
                165                 170                 175

Trp Ala Glu Leu Glu Leu Val Asn His Tyr Ile Ser Pro Asn Ala Tyr
            180                 185                 190

Pro Tyr Leu Asp Ile Asn Asn His Ser Tyr Gly Val Ala Leu Ser Asn
        195                 200                 205

Arg Gln
    210

<210> SEQ ID NO 4
<211> LENGTH: 30
<212> TYPE: PRT
<213> ORGANISM: Bombyx mori cytoplasmic polyhedrosis virus

<400> SEQUENCE: 4

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser
            20                  25                  30

<210> SEQ ID NO 5
<211> LENGTH: 273
<212> TYPE: PRT
<213> ORGANISM: Artificial Sequence
<220> FEATURE:
<223> OTHER INFORMATION: synthesized protein

<400> SEQUENCE: 5

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Gly Ser
            20                  25                  30

Ile Ala Ser Met Ser Lys Gly Glu Glu Leu Phe Thr Gly Val Val Pro
        35                  40                  45

```
Ile Leu Val Glu Leu Asp Gly Asp Val Asn Gly His Lys Phe Ser Val
 50                  55                  60
Arg Gly Glu Gly Glu Gly Asp Ala Thr Asn Gly Lys Leu Thr Leu Lys
 65                  70                  75                  80
Phe Ile Cys Thr Thr Gly Lys Leu Pro Val Pro Trp Pro Thr Leu Val
                 85                  90                  95
Thr Thr Leu Thr Tyr Gly Val Gln Cys Phe Ser Arg Tyr Pro Asp His
            100                 105                 110
Met Lys Arg His Asp Phe Phe Lys Ser Ala Met Pro Glu Gly Tyr Val
            115                 120                 125
Gln Glu Arg Thr Ile Ser Phe Lys Asp Asp Gly Thr Tyr Lys Thr Arg
130                 135                 140
Ala Glu Val Lys Phe Glu Gly Asp Thr Leu Val Asn Arg Ile Glu Leu
145                 150                 155                 160
Lys Gly Ile Asp Phe Lys Glu Asp Gly Asn Ile Leu Gly His Lys Leu
                165                 170                 175
Glu Tyr Asn Phe Asn Ser His Asn Val Tyr Ile Thr Ala Asp Lys Gln
            180                 185                 190
Lys Asn Gly Ile Lys Ala Asn Phe Lys Ile Arg His Asn Val Glu Asp
            195                 200                 205
Gly Ser Val Gln Leu Ala Asp His Tyr Gln Gln Asn Thr Pro Ile Gly
210                 215                 220
Asp Gly Pro Val Leu Leu Pro Asp Asn His Tyr Leu Ser Thr Gln Ser
225                 230                 235                 240
Val Leu Ser Lys Asp Pro Asn Glu Lys Arg Asp His Met Val Leu Leu
                245                 250                 255
Glu Phe Val Thr Ala Ala Gly Ile Thr His Gly Met Asp Glu Leu Tyr
                260                 265                 270
Lys

<210> SEQ ID NO 6
<211> LENGTH: 8
<212> TYPE: PRT
<213> ORGANISM: Bombyx mori cytoplasmic polyhedrosis virus

<400> SEQUENCE: 6

Glu Tyr Arg Glu Gly Gln His Asn
1               5

<210> SEQ ID NO 7
<211> LENGTH: 10
<212> TYPE: PRT
<213> ORGANISM: Artificial Sequence
<220> FEATURE:
<223> OTHER INFORMATION: synthesized sequence

<400> SEQUENCE: 7

Tyr Tyr Asp Pro Glu Thr Gly Thr Trp Tyr
1               5                  10

<210> SEQ ID NO 8
<211> LENGTH: 250
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 8
```

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
                20                  25                  30

Gly Glu Val Ser Val Trp Val Tyr Ala Tyr Tyr Ser Asp Gly Ser Val
            35                  40                  45

Leu Val Ile Asn Lys Asn Ser Gln Tyr Lys Val Gly Ile Ser Glu Thr
        50                  55                  60

Phe Lys Ala Leu Lys Tyr Tyr Asp Pro Glu Thr Gly Thr Trp Tyr Asp
65                  70                  75                  80

Ser Tyr Asp Glu Tyr Glu Val Asn Gln Ser Ile Tyr Tyr Pro Asn Gly
                85                  90                  95

Gly Asp Ala Arg Lys Phe His Ser Asn Ala Lys Pro Arg Ala Ile Gln
                100                 105                 110

Ile Ile Phe Ser Pro Ser Val Asn Val Arg Thr Ile Lys Met Ala Lys
            115                 120                 125

Gly Asn Ala Val Ser Val Pro Asp Glu Tyr Leu Gln Arg Ser His Pro
        130                 135                 140

Trp Glu Ala Thr Gly Ile Lys Tyr Arg Lys Ile Lys Arg Asp Gly Glu
145                 150                 155                 160

Ile Val Gly Tyr Ser His Tyr Phe Glu Leu Pro His Glu Tyr Asn Ser
                165                 170                 175

Ile Ser Leu Ala Val Ser Gly Val His Lys Asn Pro Ser Ser Tyr Asn
                180                 185                 190

Val Gly Ser Ala His Asn Val Met Asp Val Phe Gln Ser Cys Asp Leu
            195                 200                 205

Ala Leu Arg Phe Cys Asn Arg Tyr Trp Ala Glu Leu Glu Leu Val Asn
        210                 215                 220

His Tyr Ile Ser Pro Asn Ala Tyr Pro Tyr Leu Asp Ile Asn Asn His
225                 230                 235                 240

Ser Tyr Gly Val Ala Leu Ser Asn Arg Gln
                245                 250

<210> SEQ ID NO 9
<211> LENGTH: 253
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 9

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
                20                  25                  30

Gly Glu Val Ser Val Trp Val Tyr Ala Tyr Tyr Ser Asp Gly Ser Val
            35                  40                  45

Leu Val Ile Asn Lys Asn Ser Gln Tyr Lys Val Gly Ile Ser Glu Thr
        50                  55                  60

Phe Lys Ala Leu Lys Glu Tyr Tyr Asp Pro Glu Thr Gly Thr Trp
65                  70                  75                  80

Tyr Asn Asp Ser Tyr Asp Glu Tyr Glu Val Asn Gln Ser Ile Tyr Tyr
                85                  90                  95

Pro Asn Gly Gly Asp Ala Arg Lys Phe His Ser Asn Ala Lys Pro Arg
            100                 105                 110

```
Ala Ile Gln Ile Ile Phe Ser Pro Ser Val Asn Val Arg Thr Ile Lys
        115                 120                 125

Met Ala Lys Gly Asn Ala Val Ser Val Pro Asp Glu Tyr Leu Gln Arg
130                 135                 140

Ser His Pro Trp Glu Ala Thr Gly Ile Lys Tyr Arg Lys Ile Lys Arg
145                 150                 155                 160

Asp Gly Glu Ile Val Gly Tyr Ser His Tyr Phe Glu Leu Pro His Glu
                165                 170                 175

Tyr Asn Ser Ile Ser Leu Ala Val Ser Gly Val His Lys Asn Pro Ser
                180                 185                 190

Ser Tyr Asn Val Gly Ser Ala His Asn Val Met Asp Val Phe Gln Ser
        195                 200                 205

Cys Asp Leu Ala Leu Arg Phe Cys Asn Arg Tyr Trp Ala Glu Leu Glu
        210                 215                 220

Leu Val Asn His Tyr Ile Ser Pro Asn Ala Tyr Pro Tyr Leu Asp Ile
225                 230                 235                 240

Asn Asn His Ser Tyr Gly Val Ala Leu Ser Asn Arg Gln
                245                 250

<210> SEQ ID NO 10
<211> LENGTH: 256
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 10

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
                20                  25                  30

Gly Glu Val Ser Val Trp Val Tyr Ala Tyr Tyr Ser Asp Gly Ser Val
            35                  40                  45

Leu Val Ile Asn Lys Asn Ser Gln Tyr Lys Val Gly Ile Ser Glu Thr
50                  55                  60

Phe Lys Ala Leu Lys Glu Tyr Arg Tyr Tyr Asp Pro Glu Thr Gly Thr
65                  70                  75                  80

Trp Tyr Gln His Asn Asp Ser Tyr Asp Glu Tyr Val Asn Gln Ser
                85                  90                  95

Ile Tyr Tyr Pro Asn Gly Gly Asp Ala Arg Lys Phe His Ser Asn Ala
                100                 105                 110

Lys Pro Arg Ala Ile Gln Ile Ile Phe Ser Pro Ser Val Asn Val Arg
                115                 120                 125

Thr Ile Lys Met Ala Lys Gly Asn Ala Val Ser Val Pro Asp Glu Tyr
130                 135                 140

Leu Gln Arg Ser His Pro Trp Glu Ala Thr Gly Ile Lys Tyr Arg Lys
145                 150                 155                 160

Ile Lys Arg Asp Gly Glu Ile Val Gly Tyr Ser His Tyr Phe Glu Leu
                165                 170                 175

Pro His Glu Tyr Asn Ser Ile Ser Leu Ala Val Ser Gly Val His Lys
                180                 185                 190

Asn Pro Ser Ser Tyr Asn Val Gly Ser Ala His Asn Val Met Asp Val
        195                 200                 205

Phe Gln Ser Cys Asp Leu Ala Leu Arg Phe Cys Asn Arg Tyr Trp Ala
```

```
                    210                 215                 220
Glu Leu Glu Leu Val Asn His Tyr Ile Ser Pro Asn Ala Tyr Pro Tyr
225                 230                 235                 240

Leu Asp Ile Asn Asn His Ser Tyr Gly Val Ala Leu Ser Asn Arg Gln
                245                 250                 255

<210> SEQ ID NO 11
<211> LENGTH: 18
<212> TYPE: PRT
<213> ORGANISM: Artificial Sequence
<220> FEATURE:
<223> OTHER INFORMATION: synthesized sequence

<400> SEQUENCE: 11

Gly Gly Gly Ser Tyr Tyr Asp Pro Glu Thr Gly Thr Trp Tyr Gly Gly
1               5                   10                  15

Gly Ser

<210> SEQ ID NO 12
<211> LENGTH: 258
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 12

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
                20                  25                  30

Gly Glu Val Ser Val Trp Val Tyr Ala Tyr Tyr Ser Asp Gly Ser Val
            35                  40                  45

Leu Val Ile Asn Lys Asn Ser Gln Tyr Lys Val Gly Ile Ser Glu Thr
50                  55                  60

Phe Lys Ala Leu Lys Gly Gly Ser Tyr Tyr Asp Pro Glu Thr Gly
65                  70                  75                  80

Thr Trp Tyr Gly Gly Ser Asp Ser Tyr Asp Glu Tyr Glu Val Asn
                85                  90                  95

Gln Ser Ile Tyr Tyr Pro Asn Gly Gly Asp Ala Arg Lys Phe His Ser
                100                 105                 110

Asn Ala Lys Pro Arg Ala Ile Gln Ile Ile Phe Ser Pro Ser Val Asn
            115                 120                 125

Val Arg Thr Ile Lys Met Ala Lys Gly Asn Ala Val Ser Val Pro Asp
130                 135                 140

Glu Tyr Leu Gln Arg Ser His Pro Trp Glu Ala Thr Gly Ile Lys Tyr
145                 150                 155                 160

Arg Lys Ile Lys Arg Asp Gly Glu Ile Val Gly Tyr Ser His Tyr Phe
                165                 170                 175

Glu Leu Pro His Glu Tyr Asn Ser Ile Ser Leu Ala Val Ser Gly Val
            180                 185                 190

His Lys Asn Pro Ser Ser Tyr Asn Val Gly Ser Ala His Asn Val Met
        195                 200                 205

Asp Val Phe Gln Ser Cys Asp Leu Ala Leu Arg Phe Cys Asn Arg Tyr
    210                 215                 220

Trp Ala Glu Leu Glu Leu Val Asn His Tyr Ile Ser Pro Asn Ala Tyr
225                 230                 235                 240
```

```
Pro Tyr Leu Asp Ile Asn Asn His Ser Tyr Gly Val Ala Leu Ser Asn
                245                 250                 255

Arg Gln

<210> SEQ ID NO 13
<211> LENGTH: 4
<212> TYPE: PRT
<213> ORGANISM: Artificial Sequence
<220> FEATURE:
<223> OTHER INFORMATION: synthesized sequence

<400> SEQUENCE: 13

Gly Gly Gly Ser
1

<210> SEQ ID NO 14
<211> LENGTH: 18
<212> TYPE: PRT
<213> ORGANISM: Artificial Sequence
<220> FEATURE:
<223> OTHER INFORMATION: synthesized sequence

<400> SEQUENCE: 14

Glu Ala Ala Lys Tyr Tyr Asp Pro Glu Thr Gly Thr Trp Tyr Glu Ala
1               5                   10                  15

Ala Lys

<210> SEQ ID NO 15
<211> LENGTH: 258
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 15

Met Ala Asp Val

```
His Lys Asn Pro Ser Ser Tyr Asn Val Gly Ser Ala His Asn Val Met
        195                 200                 205

Asp Val Phe Gln Ser Cys Asp Leu Ala Leu Arg Phe Cys Asn Arg Tyr
    210                 215                 220

Trp Ala Glu Leu Glu Leu Val Asn His Tyr Ile Ser Pro Asn Ala Tyr
225             230                 235                 240

Pro Tyr Leu Asp Ile Asn Asn His Ser Tyr Gly Val Ala Leu Ser Asn
            245                 250                 255

Arg Gln

<210> SEQ ID NO 16
<211> LENGTH: 4
<212> TYPE: PRT
<213> ORGANISM: Artificial Sequence
<220> FEATURE:
<223> OTHER INFORMATION: synthesized sequence

<400> SEQUENCE: 16

Glu Ala Ala Lys
1

<210> SEQ ID NO 17
<211> LENGTH: 245
<212> TYPE: PRT
<213> ORGANISM: Artificial Sequence
<220> FEATURE:
<223> OTHER INFORMATION: derived from Bombyx mori cytoplasmic
      polyhedrosis virus

<400> SEQUENCE: 17

Met Ala Asp Val Ala Gly Thr Ser Asn Arg Asp Phe Arg Gly Arg Glu
1               5                   10                  15

Gln Arg Leu Phe Asn Ser Glu Gln Tyr Asn Tyr Asn Asn Ser Leu Asn
            20                  25                  30

Gly Glu Val Ser Val Trp Val Tyr Ala Tyr Tyr Ser Asp Gly Ser Val
        35                  40                  45

Leu Val Ile Asn Lys Asn Ser Gln Tyr Lys Val Gly Ile Ser Glu Thr
50                  55                  60

Phe Lys Ala Leu Lys Glu Tyr Arg Glu Gly Gln His Asn Asp Ser Tyr
65                  70                  75                  80

Asp Glu Tyr Glu Val Asn Gln Ser Ile Tyr Tyr Pro Asn Gly Gly Asp
                85                  90                  95

Ala Arg Lys Phe His Ser Asn Ala Lys Pro Arg Ala Ile Gln Ile Ile
            100                 105                 110

Phe Ser Pro Ser Val Asn Val Arg Thr Ile Lys Met Ala Lys Gly Asn
        115                 120                 125

Ala Val Ser Val Pro Asp Glu Tyr Leu Gln Arg Ser His Pro Trp Glu
130                 135                 140

Ala Thr Gly Ile Lys Tyr Arg Lys Ile Lys Arg Asp Gly Glu Ile Val
145                 150                 155                 160

Gly Tyr Ser His Tyr Phe Glu Leu Pro His Glu Tyr Asn Ser Ile Ser
                165                 170                 175

Leu Ala Val Ser Gly Val His Lys Asn Pro Ser Ser Tyr Asn Val His
            180                 185                 190

Asn Val Met Asp Val Phe Gln Ser Cys Asp Leu Ala Leu Arg Phe Cys
        195                 200                 205

Asn Arg Tyr Trp Ala Glu Leu Glu Leu Val Asn His Tyr Ile Ser Pro
```

```
            210                 215                 220
Asn Ala Tyr Pro Tyr Leu Asp Ile Asn His Ser Tyr Gly Val Ala
225                 230                 235                 240

Leu Ser Asn Arg Gln
                245

<210> SEQ ID NO 18
<211> LENGTH: 644
<212> TYPE: PRT
<213> ORGANISM: Bacillus thuringiensis

<400> SEQUENCE: 18

Met Asn Pro Asn Asn Arg Ser Glu His Asp Thr Ile Lys Thr Thr Glu
1               5                   10                  15

Asn Asn Glu Val Pro Thr Asn His Val Gln Tyr Pro Leu Ala Glu Thr
                20                  25                  30

Pro Asn Pro Thr Leu Glu Asp Leu Asn Tyr Lys Glu Phe Leu Arg Met
            35                  40                  45

Thr Ala Asp Asn Asn Thr Glu Ala Leu Asp Ser Ser Thr Thr Lys Asp
        50                  55                  60

Val Ile Gln Lys Gly Ile Ser Val Val Gly Asp Leu Leu Gly Val Val
65                  70                  75                  80

Gly Phe Pro Phe Gly Gly Ala Leu Val Ser Phe Tyr Thr Asn Phe Leu
                85                  90                  95

Asn Thr Ile Trp Pro Ser Glu Asp Pro Trp Lys Ala Phe Met Glu Gln
            100                 105                 110

Val Glu Ala Leu Met Asp Gln Lys Ile Ala Asp Tyr Ala Lys Asn Lys
        115                 120                 125

Ala Leu Ala Glu Leu Gln Gly Leu Gln Asn Asn Val Glu Asp Tyr Val
130                 135                 140

Ser Ala Leu Ser Ser Trp Gln Lys Asn Pro Val Ser Ser Arg Asn Pro
145                 150                 155                 160

His Ser Gln Gly Arg Ile Arg Glu Leu Phe Ser Gln Ala Glu Ser His
                165                 170                 175

Phe Arg Asn Ser Met Pro Ser Phe Ala Ile Ser Gly Tyr Glu Val Leu
            180                 185                 190

Phe Leu Thr Thr Tyr Ala Gln Ala Ala Asn Thr His Leu Phe Leu Leu
        195                 200                 205

Lys Asp Ala Gln Ile Tyr Gly Glu Glu Trp Gly Tyr Glu Lys Glu Asp
210                 215                 220

Ile Ala Glu Phe Tyr Lys Arg Gln Leu Lys Leu Thr Gln Glu Tyr Thr
225                 230                 235                 240

Asp His Cys Val Lys Trp Tyr Asn Val Gly Leu Asp Lys Leu Arg Gly
                245                 250                 255

Ser Ser Tyr Glu Ser Trp Val Asn Phe Asn Arg Tyr Arg Arg Glu Met
            260                 265                 270

Thr Leu Thr Val Leu Asp Leu Ile Ala Leu Phe Pro Leu Tyr Asp Val
        275                 280                 285

Arg Leu Tyr Pro Lys Glu Val Lys Thr Glu Leu Thr Arg Asp Val Leu
290                 295                 300

Thr Asp Pro Ile Val Gly Val Asn Asn Leu Arg Gly Tyr Gly Thr Thr
305                 310                 315                 320

Phe Ser Asn Ile Glu Asn Tyr Ile Arg Lys Pro His Leu Phe Asp Tyr
                325                 330                 335
```

```
Leu His Arg Ile Gln Phe His Thr Arg Phe Gln Pro Gly Tyr Tyr Gly
                340                 345                 350

Asn Asp Ser Phe Asn Tyr Trp Ser Gly Asn Tyr Val Ser Thr Arg Pro
            355                 360                 365

Ser Ile Gly Ser Asn Asp Ile Ile Thr Ser Pro Phe Tyr Gly Asn Lys
        370                 375                 380

Ser Ser Glu Pro Val Gln Asn Leu Glu Phe Asn Gly Glu Lys Val Tyr
385                 390                 395                 400

Arg Ala Val Ala Asn Thr Asn Leu Ala Val Trp Pro Ser Ala Val Tyr
                405                 410                 415

Ser Gly Val Thr Lys Val Glu Phe Ser Gln Tyr Asn Asp Gln Thr Asp
            420                 425                 430

Glu Ala Ser Thr Gln Thr Tyr Asp Ser Lys Arg Asn Val Gly Ala Val
        435                 440                 445

Ser Trp Asp Ser Ile Asp Gln Leu Pro Pro Glu Thr Thr Asp Glu Pro
        450                 455                 460

Leu Glu Lys Gly Tyr Ser His Gln Leu Asn Tyr Val Met Cys Phe Leu
465                 470                 475                 480

Met Gln Gly Ser Arg Gly Thr Ile Pro Val Leu Thr Trp Thr His Lys
                485                 490                 495

Ser Val Asp Phe Phe Asn Met Ile Asp Ser Lys Lys Ile Thr Gln Leu
            500                 505                 510

Pro Leu Val Lys Ala Tyr Lys Leu Gln Ser Gly Ala Ser Val Val Ala
        515                 520                 525

Gly Pro Arg Phe Thr Gly Gly Asp Ile Ile Gln Cys Thr Glu Asn Gly
530                 535                 540

Ser Ala Ala Thr Ile Tyr Val Thr Pro Asp Val Ser Tyr Ser Gln Lys
545                 550                 555                 560

Tyr Arg Ala Arg Ile His Tyr Ala Ser Thr Ser Gln Ile Thr Phe Thr
                565                 570                 575

Leu Ser Leu Asp Gly Ala Pro Phe Asn Gln Tyr Tyr Phe Asp Lys Thr
            580                 585                 590

Ile Asn Lys Gly Asp Thr Leu Thr Tyr Asn Ser Phe Asn Leu Ala Ser
        595                 600                 605

Phe Ser Thr Pro Phe Glu Leu Ser Gly Asn Asn Leu Gln Ile Gly Val
        610                 615                 620

Thr Gly Leu Ser Ala Gly Asp Lys Val Tyr Ile Asp Lys Ile Glu Phe
625                 630                 635                 640

Ile Pro Val Asn

<210> SEQ ID NO 19
<211> LENGTH: 340
<212> TYPE: PRT
<213> ORGANISM: Trypanosoma brucei

<400> SEQUENCE: 19

Met His Leu Met Arg Ala Cys Ile Thr Phe Cys Ile Ala Ser Thr Ala
1               5                   10                  15

Val Val Ala Val Asn Ala Ala Leu Val Ala Glu Asp Ala Pro Val Leu
                20                  25                  30

Ser Lys Ala Phe Val Asp Arg Val Asn Arg Leu Asn Arg Gly Ile Trp
            35                  40                  45

Lys Ala Lys Tyr Asp Gly Val Met Gln Asn Ile Thr Leu Arg Glu Ala
        50                  55                  60
```

-continued

```
Lys Arg Leu Asn Gly Val Ile Lys Lys Asn Asn Ala Ser Ile Leu
 65                  70                  75                  80

Pro Lys Arg Arg Phe Thr Glu Glu Ala Arg Ala Pro Leu Pro Ser
                 85                  90                  95

Ser Phe Asp Ser Ala Glu Ala Trp Pro Asn Cys Pro Thr Ile Pro Gln
                100                 105                 110

Ile Ala Asp Gln Ser Ala Cys Gly Ser Cys Trp Ala Val Ala Ala Ala
                115                 120                 125

Ser Ala Met Ser Asp Arg Phe Cys Thr Met Gly Gly Val Gln Asp Val
130                 135                 140

His Ile Ser Ala Gly Asp Leu Leu Ala Cys Cys Ser Asp Cys Gly Asp
145                 150                 155                 160

Gly Cys Asn Gly Gly Asp Pro Asp Arg Ala Trp Ala Tyr Phe Ser Ser
                165                 170                 175

Thr Gly Leu Val Ser Asp Tyr Cys Gln Pro Tyr Pro Phe Pro His Cys
                180                 185                 190

Ser His His Ser Lys Ser Lys Asn Gly Tyr Pro Pro Cys Ser Gln Phe
                195                 200                 205

Asn Phe Asp Thr Pro Lys Cys Asn Tyr Thr Cys Asp Asp Pro Thr Ile
                210                 215                 220

Pro Val Val Asn Tyr Arg Ser Trp Thr Ser Tyr Ala Leu Gln Gly Glu
225                 230                 235                 240

Asp Asp Tyr Met Arg Glu Leu Phe Phe Arg Gly Pro Phe Glu Val Ala
                245                 250                 255

Phe Asp Val Tyr Glu Asp Phe Ile Ala Tyr Asn Ser Gly Val Tyr His
                260                 265                 270

His Val Ser Gly Gln Tyr Leu Gly Gly His Ala Val Arg Leu Val Gly
                275                 280                 285

Trp Gly Thr Ser Asn Gly Val Pro Tyr Trp Lys Ile Ala Asn Ser Trp
                290                 295                 300

Asn Thr Glu Trp Gly Met Asp Gly Tyr Phe Leu Ile Arg Arg Gly Ser
305                 310                 315                 320

Ser Glu Cys Gly Ile Glu Asp Gly Gly Ser Ala Gly Ile Pro Leu Ala
                325                 330                 335

Pro Asn Thr Ala
            340

<210> SEQ ID NO 20
<211> LENGTH: 548
<212> TYPE: PRT
<213> ORGANISM: Luciola mingrelica

<400> SEQUENCE: 20

Met Glu Met Glu Lys Glu Asn Val Val Tyr Gly Pro Leu Pro Phe
 1                5                  10                  15

Tyr Pro Ile Glu Glu Gly Ser Ala Gly Ile Gln Leu His Lys Tyr Met
                 20                  25                  30

His Gln Tyr Ala Lys Leu Gly Ala Ile Ala Phe Ser Asn Ala Leu Thr
             35                  40                  45

Gly Val Asp Ile Ser Tyr Gln Gly Tyr Phe Asp Ile Thr Cys Arg Leu
 50                  55                  60

Ala Glu Ala Met Lys Asn Phe Gly Met Lys Pro Glu Glu His Ile Ala
 65                  70                  75                  80

Leu Cys Ser Glu Asn Cys Glu Glu Phe Phe Ile Pro Val Leu Ala Gly
                 85                  90                  95
```

-continued

Leu Tyr Ile Gly Val Ala Val Ala Pro Thr Asn Glu Ile Tyr Thr Leu
            100                 105                 110

Arg Glu Leu Asn His Ser Leu Gly Ile Ala Gln Pro Thr Ile Val Phe
            115                 120                 125

Ser Ser Arg Lys Gly Leu Pro Lys Val Leu Glu Val Gln Lys Thr Val
            130                 135                 140

Thr Cys Ile Lys Lys Ile Val Ile Leu Asp Ser Lys Val Asn Phe Gly
145                 150                 155                 160

Gly His Asp Cys Met Glu Thr Phe Ile Lys Lys His Val Glu Leu Gly
                165                 170                 175

Phe Gln Pro Ser Ser Phe Val Pro Ile Asp Val Lys Asn Arg Lys Gln
            180                 185                 190

His Val Ala Leu Leu Met Asn Ser Ser Gly Ser Thr Gly Leu Pro Lys
            195                 200                 205

Gly Val Arg Ile Thr His Glu Gly Ala Val Thr Arg Phe Ser His Ala
            210                 215                 220

Lys Asp Pro Ile Tyr Gly Asn Gln Val Ser Pro Gly Thr Ala Ile Leu
225                 230                 235                 240

Thr Val Val Pro Phe His His Gly Phe Gly Met Phe Thr Thr Leu Gly
                245                 250                 255

Tyr Phe Ala Cys Gly Tyr Arg Val Val Met Leu Thr Lys Phe Asp Glu
            260                 265                 270

Glu Leu Phe Leu Arg Thr Leu Gln Asp Tyr Lys Cys Thr Ser Val Ile
            275                 280                 285

Leu Val Pro Thr Leu Phe Ala Ile Leu Asn Lys Ser Glu Leu Ile Asp
            290                 295                 300

Lys Phe Asp Leu Ser Asn Leu Thr Glu Ile Ala Ser Gly Gly Ala Pro
305                 310                 315                 320

Leu Ala Lys Glu Val Gly Glu Ala Val Ala Arg Arg Phe Asn Leu Pro
            325                 330                 335

Gly Val Arg Gln Gly Tyr Gly Leu Thr Glu Thr Thr Ser Ala Phe Ile
            340                 345                 350

Ile Thr Pro Glu Gly Asp Asp Lys Pro Gly Ala Ser Gly Lys Val Val
            355                 360                 365

Pro Leu Phe Lys Val Lys Val Ile Asp Leu Asp Thr Lys Lys Thr Leu
            370                 375                 380

Gly Val Asn Arg Arg Gly Glu Ile Cys Val Lys Gly Pro Ser Leu Met
385                 390                 395                 400

Leu Gly Tyr Ser Asn Asn Pro Glu Ala Thr Arg Glu Thr Ile Asp Glu
            405                 410                 415

Glu Gly Trp Leu His Thr Gly Asp Ile Gly Tyr Tyr Asp Glu Asp Glu
            420                 425                 430

His Phe Phe Ile Val Asp Arg Leu Lys Ser Leu Ile Lys Tyr Lys Gly
            435                 440                 445

Tyr Gln Val Pro Pro Ala Glu Leu Glu Ser Val Leu Leu Gln His Pro
            450                 455                 460

Asn Ile Phe Asp Ala Gly Val Ala Gly Val Pro Asp Pro Asp Ala Gly
465                 470                 475                 480

Glu Leu Pro Gly Ala Val Val Met Glu Lys Gly Lys Thr Met Thr
            485                 490                 495

Glu Lys Glu Ile Val Asp Tyr Val Asn Ser Gln Val Val Asn His Lys
            500                 505                 510

```
Arg Leu Arg Gly Gly Val Arg Phe Val Asp Glu Val Pro Lys Gly Leu
            515                 520                 525

Thr Gly Lys Ile Asp Ala Lys Val Ile Arg Glu Ile Leu Lys Lys Pro
            530                 535                 540

Gln Ala Lys Met
545

<210> SEQ ID NO 21
<211> LENGTH: 311
<212> TYPE: PRT
<213> ORGANISM: Renilla reniformis

<400> SEQUENCE: 21

Met Thr Ser Lys Val Tyr Asp Pro Glu Gln Arg Lys Arg Met Ile Thr
1               5                   10                  15

Gly Pro Gln Trp Trp Ala Arg Cys Lys Gln Met Asn Val Leu Asp Ser
            20                  25                  30

Phe Ile Asn Tyr Tyr Asp Ser Glu Lys His Ala Glu Asn Ala Val Ile
            35                  40                  45

Phe Leu His Gly Asn Ala Ala Ser Ser Tyr Leu Trp Arg His Val Val
    50                  55                  60

Pro His Ile Glu Pro Val Ala Arg Cys Ile Ile Pro Asp Leu Ile Gly
65                  70                  75                  80

Met Gly Lys Ser Gly Lys Ser Gly Asn Gly Ser Tyr Arg Leu Leu Asp
                85                  90                  95

His Tyr Lys Tyr Leu Thr Ala Trp Phe Glu Leu Leu Asn Leu Pro Lys
            100                 105                 110

Lys Ile Ile Phe Val Gly His Asp Trp Gly Ala Cys Leu Ala Phe His
        115                 120                 125

Tyr Ser Tyr Glu His Gln Asp Lys Ile Lys Ala Ile Val His Ala Glu
    130                 135                 140

Ser Val Val Asp Val Ile Glu Ser Trp Asp Glu Trp Pro Asp Ile Glu
145                 150                 155                 160

Glu Asp Ile Ala Leu Ile Lys Ser Glu Glu Gly Glu Lys Met Val Leu
                165                 170                 175

Glu Asn Asn Phe Phe Val Glu Thr Met Leu Pro Ser Lys Ile Met Arg
            180                 185                 190

Lys Leu Glu Pro Glu Glu Phe Ala Ala Tyr Leu Glu Pro Phe Lys Glu
        195                 200                 205

Lys Gly Glu Val Arg Arg Pro Thr Leu Ser Trp Pro Arg Glu Ile Pro
    210                 215                 220

Leu Val Lys Gly Gly Lys Pro Asp Val Val Gln Ile Val Arg Asn Tyr
225                 230                 235                 240

Asn Ala Tyr Leu Arg Ala Ser Asp Asp Leu Pro Lys Met Phe Ile Glu
                245                 250                 255

Ser Asp Pro Gly Phe Phe Ser Asn Ala Ile Val Glu Gly Ala Lys Lys
            260                 265                 270

Phe Pro Asn Thr Glu Phe Val Lys Val Lys Gly Leu His Phe Ser Gln
        275                 280                 285

Glu Asp Ala Pro Asp Glu Met Gly Lys Tyr Ile Lys Ser Phe Val Glu
    290                 295                 300

Arg Val Leu Lys Asn Glu Gln
305                 310

<210> SEQ ID NO 22
```

```
<211> LENGTH: 635
<212> TYPE: PRT
<213> ORGANISM: Avian orthoreovirus

<400> SEQUENCE: 22
```

| | | | | | | | | | | | | | | |
|---|---|---|---|---|---|---|---|---|---|---|---|---|---|---|
| Met | Ala | Ser | Thr | Lys | Trp | Gly | Asp | Lys | Pro | Met | Ser | Leu | Ser | Met | Ser |
| 1 | | | | 5 | | | | | 10 | | | | | 15 | |

Met Ala Ser Thr Lys Trp Gly Asp Lys Pro Met Ser Leu Ser Met Ser
1               5                   10                  15

His Asp Gly Ser Ser Ile Arg Ser Ala Ala Ser Gln Phe Leu Ser Val
            20                  25                  30

Pro Leu Ser His Ser Thr Pro Ile Pro Pro Gln Arg Lys Thr Val Leu
        35                  40                  45

Leu Lys Phe Met Ile Gly Asp Asp Leu Val Thr Val Gln Gly Ala Leu
50                  55                  60

Ala Pro Phe Asp Glu Tyr Trp Tyr Asp Asn Gln Pro Leu Leu Ala Gln
65                  70                  75                  80

Ala Val Glu Met Leu Ala Ser Glu Asp Arg Leu Arg Gln Phe Glu His
                85                  90                  95

Tyr Glu Lys Phe Leu Leu Lys Lys Gly His Gln Ile Ala Glu Ile Met
            100                 105                 110

Asn Arg Leu Arg Leu Phe Phe Thr Asp Val Leu Lys Val Lys Met Glu
        115                 120                 125

Ala Glu Ala Leu Pro Ala Leu Ala Gln Tyr Leu Met Val Gly Thr Leu
130                 135                 140

Glu Ala Val Ser Thr Ala His Ser Pro Asp Ala Cys Val Pro Val Thr
145                 150                 155                 160

Ser Lys Val Val Thr Lys Gln Gln Thr Ile Ala Lys Ser Pro Gly Arg
                165                 170                 175

Leu Asp Glu Glu Glu Tyr Asn Val Ile Arg Ser Arg Phe Leu Thr His
            180                 185                 190

Glu Val Phe Asp Leu Thr Ser Asp Leu Pro Gly Val Gln Pro Phe Met
        195                 200                 205

Asp Met Tyr Tyr Ala Thr Val Pro Arg Ala Asp Ser Thr Gly Trp Cys
210                 215                 220

Val Tyr Arg Arg Lys Gly Leu Leu Ile His Ser Pro Asp Glu Gln Phe
225                 230                 235                 240

Ser Asp Leu Thr Ile Phe Ser Thr Arg Leu Thr Ala Ser His Glu Leu
                245                 250                 255

Gln Leu Val Ala Gly Asp Val Val Ala Cys Phe Asp Leu Met Asp
            260                 265                 270

Val Ser Asp Ile Ala Pro Ser His His Ala Ser Val Gln Glu Glu Arg
        275                 280                 285

Thr Leu Gly Thr Ser Lys Tyr Ser Asn Ile Thr Ala Asn Asp His Pro
290                 295                 300

Leu Val Phe Phe Ser Pro Ser Ala Leu Arg Trp Ala Ile Asp His Ala
305                 310                 315                 320

Cys Thr Asp Ser Leu Val Ser Thr Arg Asn Ile Arg Val Cys Val Gly
                325                 330                 335

Ile Asp Pro Leu Val Thr Arg Trp Thr Arg Asp Gly Val Gln Glu Ala
            340                 345                 350

Ala Ile Leu Met Asp Asp Lys Leu Pro Ser Ala Gly Arg Ala Arg Met
        355                 360                 365

Ala Leu Arg Thr Leu Leu Leu Ala Arg Arg Ser Pro Met Pro Ser Phe
370                 375                 380

Leu Leu Gly Ala Leu Lys Gln Ser Gly Gly Gln Leu Leu Glu His Tyr

```
                385                 390                 395                 400
        Arg Cys Asp Ala Ala Asn Arg Tyr Gly Ser Pro Thr Val Pro Met Ser
                            405                 410                 415
        His Pro Pro Cys Ser Lys Cys Pro Glu Leu Lys Glu Gln Ile Thr
                            420                 425                 430
        Lys Leu Ser Ser Pro Thr Pro Lys Ile Asp Ser Thr Thr Gly Pro
                            435                 440                 445
        Ala Ala Leu Leu Ser Lys Ile Ser Asp Leu Gln Arg Ala Asn Arg Glu
        450                 455                 460
        Leu Ser Leu Lys Leu Val Asp Met Gln Pro Ala Arg Glu Asp His Leu
        465                 470                 475                 480
        Leu Ser Tyr Leu Asn Glu His Val Cys Val Asn Ala Arg Asp His Glu
                            485                 490                 495
        Lys Gly Leu Leu Ser Arg Cys Asn Val Ser Asn Glu Ser Ile Ser Ser
                            500                 505                 510
        Ile Leu Asp Gln Arg Met Lys Asn Arg Glu Arg Phe Glu Thr Arg Leu
                            515                 520                 525
        Arg His Glu Ala Ser Ala Glu Trp Glu Pro Arg Val Glu Ala Leu Asn
                            530                 535                 540
        Gln Glu Leu Ala Lys Ala Arg Val Glu Gln Gln Asp Met Met Thr Gln
        545                 550                 555                 560
        Ser Leu Gln Tyr Leu Asn Glu Arg Asp Glu Leu Leu His Glu Val Asp
                            565                 570                 575
        Glu Leu Lys Arg Glu Leu Thr Thr Leu Arg Ala Ala Asn Val Arg Leu
                            580                 585                 590
        Asn Ala Asp Asn His Arg Met Ser Arg Ala Thr Arg Val Gly Asp Ala
                            595                 600                 605
        Phe Val Ser Asp Ile Glu Pro Leu Pro Ser Gly Ile Pro Gly Glu Ser
                            610                 615                 620
        Lys Pro Ser Met Glu Glu Leu Val Asp Asp Leu
        625                 630                 635

<210> SEQ ID NO 23
<211> LENGTH: 387
<212> TYPE: PRT
<213> ORGANISM: unidentified entomopoxvirus

<400> SEQUENCE: 23

Met Phe Ile Lys Ile Leu Pro Ile Leu Ile Leu Phe Leu Asp Tyr Val
        1               5                   10                  15

Ser Gly His Gly Tyr Ile Thr Phe Pro Ile Ala Arg Gln Arg Arg Cys
                        20                  25                  30

Asn Val Gln Gly Gly Phe Trp Trp Pro Pro Gly Gly Ser Gly Ile Pro
                    35                  40                  45

Asp Pro Met Cys Arg Ala Ala Tyr Gln Asn Val Tyr Asn Lys Val Leu
            50                  55                  60

Gln Gln Gly Gly Thr Ile Asp Gln Ala Ala Ser Ala Ala Gln Tyr Met
        65                  70                  75                  80

Phe Gln Gln Asp Asn Glu Tyr Ala Ala Leu Ala Gly Pro Asn Tyr Leu
                        85                  90                  95

Asp Gln Asn His Ile Arg Asn Asn Val Val Pro Asn Tyr Leu Cys Ala
                        100                 105                 110

Ala His Ala Thr Thr Trp Arg Ile Arg Pro Phe Gly Asp Lys Thr Gly
                    115                 120                 125
```

```
Met Asp Val Ser Gly Ser Trp Thr Pro Thr Val Ile Pro Leu Gln Asp
        130                 135                 140

Asn Thr Val Ser Thr Val Pro Ile Glu Phe Glu Phe Cys Pro Thr Ala
145                 150                 155                 160

Ile His Glu Pro Ser Phe Phe Glu Ile Tyr Ile Thr Val Pro Ser Phe
                165                 170                 175

Asn Val Tyr Thr Asp Gln Val Thr Trp Gln Gln Leu Ile Asn Ile Phe
            180                 185                 190

Thr Gly Pro Ile Pro Leu Val Gln Arg Arg Pro Asp Ser Gln Cys Asn
        195                 200                 205

Ala His Asn Leu Val Tyr Arg Thr Thr Val Gly Ile Pro Val Arg Gln
    210                 215                 220

Thr Gln Phe Val Leu Tyr Val Arg Trp Gln Arg Asn Asp Pro Val Gly
225                 230                 235                 240

Glu Gly Phe Tyr Asn Cys Ala Asp Val Ile Phe Ala His Arg Leu Gly
                245                 250                 255

Ile Asn Glu Glu Asp Lys Ile Arg Pro Pro Lys Met Lys Cys Lys Gly
            260                 265                 270

Asn Asp Lys Asp Cys Tyr Lys His His His Arg His Asn Arg Tyr Glu
        275                 280                 285

Asn Asp Tyr Glu Asn Asn Tyr Glu Asn Tyr Glu Asn Tyr Glu Asn Asn
    290                 295                 300

Tyr Glu Asn Asn Tyr Glu Asn Asn Tyr Glu Asn Asn Tyr Glu Tyr Glu
305                 310                 315                 320

Tyr Glu Tyr Asp Arg Asn Asn Arg Glu His Tyr His Lys Cys Lys His
                325                 330                 335

His Ser Cys Met Gln His Asn Tyr Tyr Glu Arg Gln Tyr Asn Thr Lys
            340                 345                 350

Asp Phe Asn Tyr Val Glu Trp Asn Asp Asp Tyr Ser Tyr Ile Glu
        355                 360                 365

Ile Ile Gln Asp Asn Arg Asp Met Cys Asp Ser Thr Thr Lys Cys Cys
    370                 375                 380

Tyr Lys Lys
385

<210> SEQ ID NO 24
<211> LENGTH: 104
<212> TYPE: PRT
<213> ORGANISM: Photorhabdus luminescens

<400> SEQUENCE: 24

Met Ile Asn Asp Met His Pro Ser Leu Ile Lys Asp Lys Asp Ile Val
1               5                   10                  15

Asp Asp Val Met Leu Arg Ser Cys Lys Ile Ile Ala Met Lys Val Met
            20                  25                  30

Pro Asp Lys Val Met Gln Val Met Val Thr Val Leu Met His Asp Gly
        35                  40                  45

Val Cys Glu Glu Met Leu Leu Lys Trp Asn Leu Leu Asp Asn Arg Gly
    50                  55                  60

Met Ala Ile Tyr Lys Val Leu Met Glu Ala Leu Cys Ala Lys Lys Asp
65                  70                  75                  80
```

```
Val Lys Ile Ser Thr Val Gly Lys Val Gly Pro Leu Gly Cys Asp Tyr
                85                  90                  95
Ile Asn Cys Val Glu Ile Ser Met
            100
```

PRODUCTION OF PROTEIN SOLID MATERIAL

TECHNICAL FIELD

The present invention relates to the production of a protein solid material. Priority is claimed on Japanese Patent Application No. 2019-145456, filed Aug. 7, 2019, the content of which is incorporated herein by reference.

BACKGROUND OF THE INVENTION

Pathogens that cause polyhedrosis in insects such as silkworms include nuclear polyhedrosis virus (Nucleopolyhedrovirus, NPV), which is a pathogenic virus for nuclear polyhedrosis, and cytoplasmic polyhedrosis virus (Cypovirus, CPV), which is a pathogenic virus for cytoplasmic polyhedrosis. The former is a DNA virus, while the latter is an RNA virus. NPV has been widely utilized by many researchers as a baculovirus vector.

The polyhedrosis viruses produce, in the late stage of infection, inclusion bodies called polyhedra in infected cells in a large quantity that reaches about half the total quantity of cellular proteins, and enclose a large number of virus particles in the inclusion bodies. The viruses enclosed in the polyhedra are protected from the inactivating action from the external environment, such as ultraviolet radiation and heat, and can maintain infectivity for an extended period of time.

The polyhedra are stable without being dissolved by many solvents and surfactants; however, the polyhedra are dissolved under alkaline conditions with a pH of about 10 or higher. When the virus particles enclosed in the polyhedra are eaten by insects, the polyhedra are dissolved by the high pH of the intestine, and the virus particles are released, causing infection.

A polyhedron as mentioned above is a product obtained by spontaneous crystallization of polyhedrin, which is a polyhedral protein, in a cell. In addition to polyhedrin, for example, an insecticidal protein of *Bacillus thuringiensis* and the like are known as proteins that are spontaneously crystallized in cells.

In the present specification, a protein that spontaneously forms a crystal is referred to as a crystalline protein, and a crystal formed as the result is referred to as a protein crystal.

Incidentally, in recent years, studies for utilizing polyhedra have been carried out. For example, in Patent Document 1, a method for producing a polyhedron-target molecule complex in which a target molecule is enclosed in a polyhedron is described. Furthermore, in Non Patent Document 1, it is described that when a gene encoding a fusion protein with the H1α-helix present at the N-terminus of the polyhedrin protein, which is a polyhedral protein, is co-expressed together with a gene encoding the polyhedrin protein in a cell, a polyhedron in which the fusion protein is enclosed in the polyhedron crystal of cytoplasmic polyhedrosis virus can be prepared.

DOCUMENTS OF RELATED ART

Patent Documents

Patent Document 1: Japanese Unexamined Patent Application, First Publication No. 2018-033404

Non Patent Documents

Non Patent Document 1: Ijiri H., et al., Structure-based targeting of bioactive proteins into cypovirus polyhedra and application to immobilized cytokines for mammalian cell culture., Biomaterials, 30 (26), 4297-4308, 2009

SUMMARY OF THE INVENTION

Problems to be Solved by the Invention

However, the methods described in Patent Document 1 and Non Patent Document 1 require a great deal of time and labor in order to obtain crystals of a polyhedral protein. Therefore, the present invention provides a technology for obtaining protein crystals in a short period of time with little effort.

Means to Solve the Problems

The present invention includes the following embodiments.

[1] A method for producing a protein crystal, the method including:

step (a) of adding a nucleic acid encoding a crystalline protein to a protein synthesis system; and step (b) of incubating the protein synthesis system for a predetermined time until the crystalline protein encoded by the added nucleic acid is expressed and the expressed crystalline protein completes the formation of crystals, in which the protein synthesis system is a cell-free protein synthesis system.

[2] The method for producing a protein crystal according to [1], in which the crystalline protein is a protein described in any one of the following (A) to (C):

(A) a cytoplasmic polyhedral protein, a nuclear polyhedral protein, an insecticidal protein, cathepsin B, an insecticidal protein, reovirus nonstructural protein (μNS), Crystalline Inclusion Protein A (CipA), or fusolin protein (Fusolin);

(B) a protein including an amino acid sequence in which one amino acid or a plurality of amino acids have been deleted, substituted, or added in an amino acid sequence of the protein of (A), the protein having a crystal-forming ability; and (C) a fusion protein of the protein of (A) or (B) and a target peptide.

[3] The method for producing a protein crystal according to [1], in which the crystalline protein is one selected from the group consisting of the following (i), (ii), (iii) and (iv):

(i) a protein including an amino acid sequence set forth in SEQ ID NO:1, or a protein including an amino acid sequence in which one amino acid or a plurality of amino acids have been deleted, substituted, or added in the amino acid sequence set forth in SEQ ID NO:1, the protein having a polyhedron-forming ability;

(ii) a protein including an amino acid sequence set forth in SEQ ID NO:2, or a protein including an amino acid sequence in which one amino acid or a plurality of amino acids have been deleted, substituted, or added in the amino acid sequence set forth in SEQ ID NO:2, the protein having a polyhedron-forming ability;

(iii) a protein including an amino acid sequence set forth in SEQ ID NO:18, or a protein including an amino acid sequence in which one amino acid or a plurality of amino acids have been deleted, substituted, or added in the amino acid sequence set forth in SEQ ID NO:18, the protein having a crystal-forming ability; and (iv) a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a protein including an amino acid sequence in which one amino acid or a plurality of amino acids have been deleted, substituted, or added in the fusion protein, the protein having a polyhedron-forming ability.

[4] The method for producing a protein crystal according to [3], in which the crystalline protein is (i) or (iv), and in the step (a), a nucleic acid encoding a fusion protein in which a target peptide is bonded to the C-terminus of an amino acid sequence set forth in SEQ ID NO:4 or to the C-terminus of an amino acid sequence in which one amino acid or a plurality of amino acids have been deleted, substituted, or added in the amino acid sequence set forth in SEQ ID NO:4, is further added to the protein synthesis system.

[5] The method for producing a protein crystal according to any one of [1] to [4], in which the cell-free protein synthesis system includes a target molecule having a molecular weight of 10 to 100,000.

[6] A fusion protein having an amino acid sequence of the 70th amino acid to the 77th amino acid of the amino acid sequence set forth in SEQ ID NO:1 substituted with a target peptide, the fusion protein having a polyhedron-forming ability, or a fusion protein including an amino acid sequence in which one amino acid or a plurality of amino acids have been deleted, substituted, or added in the fusion protein, the fusion protein having a polyhedron-forming ability.

[7] A polyhedron, in which the fusion protein according to [6] has been crystallized.

[8] A polyhedron-target molecule complex, in which a target molecule is enclosed in a crystal structure of the crystallized polyhedron according to [7].

[9] A nucleic acid encoding the fusion protein according to [6].

[10] A kit for producing a cell-free system crystal, the kit including: a nucleic acid encoding a crystalline protein; and a reagent for a cell-free protein synthesis system.

[11] The kit for producing a cell-free system crystal according to [10], in which the crystalline protein is a protein described in any one of the following (A) to (C):
(A) a cytoplasmic polyhedral protein, a nuclear polyhedral protein, an insecticidal protein, cathepsin B, an insecticidal protein, luciferase, reovirus nonstructural protein (µNS), Crystalline Inclusion Protein A (CipA), or fusolin protein (Fusolin);
(B) a protein including an amino acid sequence in which one amino acid or a plurality of amino acids have been deleted, substituted, or added in an amino acid sequence of the protein of (A), the protein having a crystal-forming ability; and
(C) a fusion protein of the protein of (A) or (B) and a target peptide.

[12] The kit for producing a cell-free system crystal according to [10], in which the crystalline protein is one selected from the group consisting of the following (i), (ii), (iii) and (iv):
(i) a protein including an amino acid sequence set forth in SEQ ID NO:1, or a protein including an amino acid sequence in which one amino acid or a plurality of amino acids have been deleted, substituted, or added in the amino acid sequence set forth in SEQ ID NO:1, the protein having a polyhedron-forming ability;
(ii) a protein including an amino acid sequence set forth in SEQ ID NO:2, or a protein including an amino acid sequence in which one amino acid or a plurality of amino acids have been deleted, substituted, or added in the amino acid sequence set forth in SEQ ID NO:1, the protein having a polyhedron-forming ability;
(iii) a protein including an amino acid sequence set forth in SEQ ID NO:18, or a protein including an amino acid sequence in which one amino acid or a plurality of amino acids have been deleted, substituted, or added in the amino acid sequence set forth in SEQ ID NO:18, the protein having a crystal-forming ability; and
(iv) a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a protein including an amino acid sequence in which one amino acid or a plurality of amino acids have been deleted, substituted, or added in the fusion protein, the protein having a polyhedron-forming ability.

[13] The kit for producing a cell-free system crystal according to [12], in which the crystalline protein is (i) or (iv), and
the kit further includes a nucleic acid encoding a fusion protein in which a target peptide is bonded to the C-terminus of an amino acid sequence set forth in SEQ ID NO:4 or to the C-terminus of an amino acid sequence in which one amino acid or a plurality of amino acids have been deleted, substituted, or added in the amino acid sequence set forth in SEQ ID NO:4.

Effects of the Invention

According to the present invention, a technology for obtaining protein crystals in a short period of time with less efforts can be provided.

EMBODIMENTS FOR CARRYING OUT THE INVENTION

[Production Method]

Figure 1:
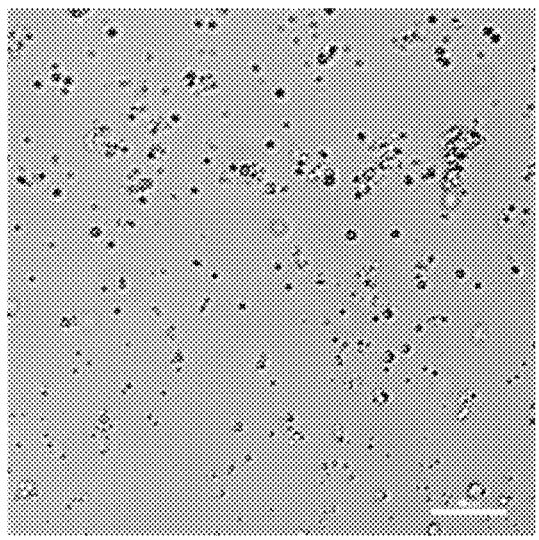
FIG. 1 is an optical microscopic image of polyhedra crystals obtained by a cell-free protein synthesis system.
Figure 2:
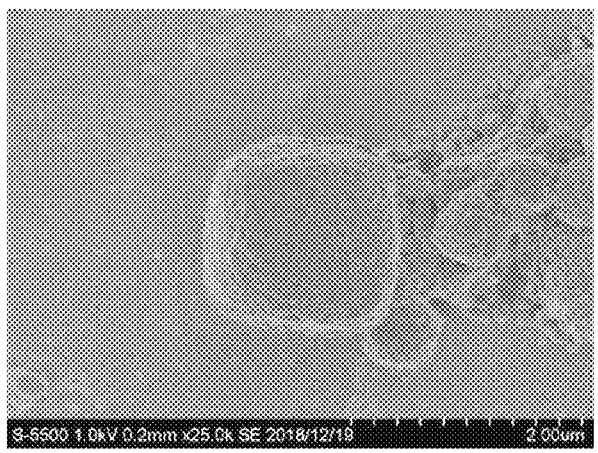
FIG. 2 is SEM images of polyhedra crystals obtained by a cell-free protein synthesis system at 15° C.
Figure 2:
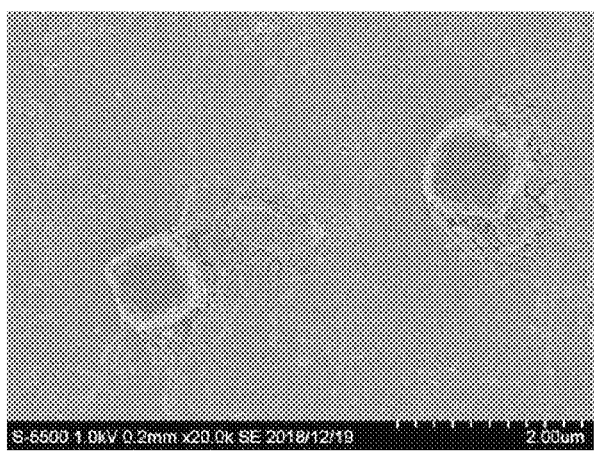
Figure 2:
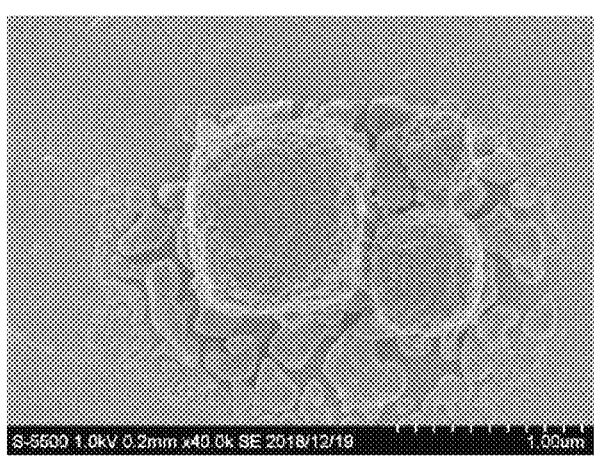
Figure 3:
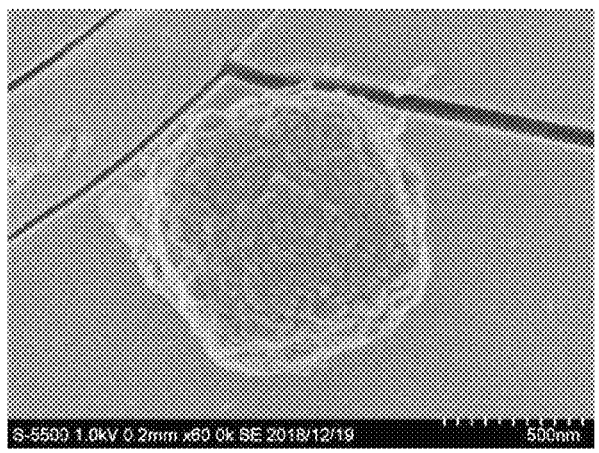
FIG. 3 is SEM images of polyhedra crystals obtained by a cell-free protein synthesis system at 20° C.
Figure 3:
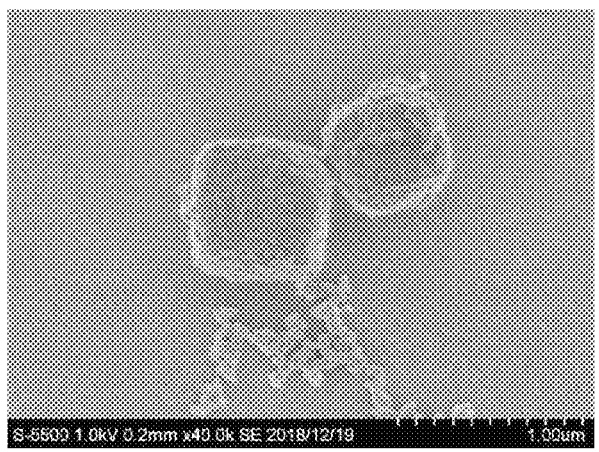
Figure 3:
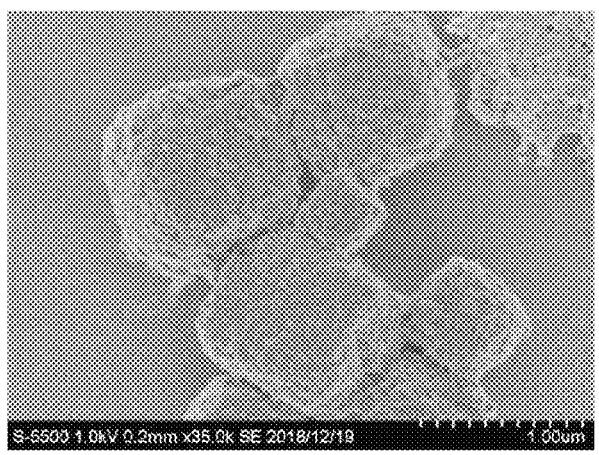
Figure 4:
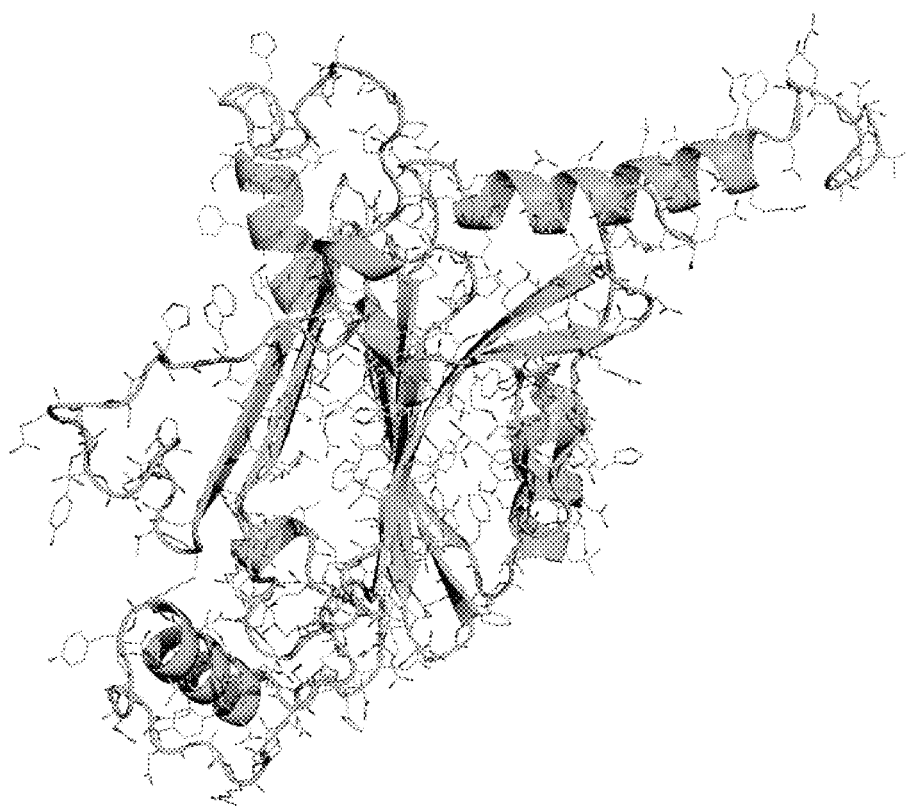
FIG. 4 shows results obtained by analyzing a three-dimensional structure of a polyhedra crystals obtained by a cell-free protein synthesis system, by an X-ray structural analysis.

According to an embodiment, the present invention provides a method for producing a protein crystal, the method including: step (a) of adding a nucleic acid encoding a crystalline protein to a protein synthesis system; and step (b) of incubating the protein synthesis system for a predetermined time until the crystalline protein encoded by the added nucleic acid is expressed and the expressed crystalline protein completes the formation of crystals, in which the protein synthesis system is a cell-free protein synthesis system.

According to the present specification, the crystalline protein means a protein capable of spontaneous self-assembling to form crystals under physiological conditions such as in the cytoplasm. Furthermore, according to the present specification, the protein crystal means a crystal obtained by crystallizing the above-mentioned crystalline protein.

The crystalline protein is not particularly limited as long as it is a protein that forms a crystal in a cell-free protein synthesis system. Even for a non-crystalline protein that originally does not form a crystal, when the non-crystalline protein becomes capable of forming a crystal in a cell-free protein synthesis system by means of techniques such as chemical modification of the protein, creation of a variant, and a fusion protein, this protein is also included in the crystalline protein according to the present specification.

More limited examples of the crystalline protein include the proteins described in any of the following (A) to (C):

(A) a cytoplasmic polyhedral protein, a nuclear polyhedral protein, an insecticidal protein, cathepsin B, luciferase, reovirus nonstructural protein (μNS), Crystalline Inclusion Protein A (CipA), or fusolin protein (Fusolin);

(B) a protein including an amino acid sequence in which one amino acid or a plurality of amino acids have been deleted, substituted, or added in an amino acid sequence of the protein of (A), the protein having a crystal-forming ability; and (C) a fusion protein of the protein of (A) or (B) and a target peptide.

The cytoplasmic polyhedral protein is a polyhedrin protein derived from a cytoplasmic polyhedrosis virus (Cypovirus, CPV), which is a pathogenic virus for cytoplasmic polyhedrosis. For example, a protein including an amino acid sequence set forth in SEQ ID NO:1 is wild-type polyhedrin protein expressed by a cytoplasmic polyhedrosis virus that infects silkworm moth.

The nuclear polyhedral protein is polyhedrin protein derived from a nuclear polyhedrosis virus (Nucleopolyhedrovirus, NPV), which is a pathogenic virus for nuclear polyhedrosis. For example, a protein including an amino acid sequence set forth in SEQ ID NO:2 is wild-type polyhedrin protein expressed by a nuclear polyhedrosis virus that infects *Autographa californica*.

The insecticidal protein is an insecticidal protein produced by *Bacillus thuringiensis*. An amino acid sequence of Cry3A protein produced by *Bacillus thuringiensis* is set forth in SEQ ID NO:18.

Cathepsin B is a protease having endopeptidase activity and exopeptidase activity. Cathepsin B is a protein that forms a crystal in cultured insect cells. An amino acid sequence of *Trypanosoma brucei*-derived cathepsin B is set forth in SEQ ID NO:19.

Luciferase is a generic name for enzymes that have the action of catalyzing a chemical reaction in which a luminescent material emits light in bioluminescence of luminescent bacteria, fireflies, and the like. Luciferase is a protein that forms a crystal in insect cells. An amino acid sequence of firefly-derived luciferase is set forth in SEQ ID NO:20, and an amino acid sequence of sea pansy-derived luciferase is set forth in SEQ ID NO:21.

μNS is reovirus nonstructural protein having crystallinity. An amino acid sequence of reovirus-derived μNS is set forth in SEQ ID NO:22.

Fusolin is a constituent protein of a crystalline protein inclusion body formed in host cells by Entomopoxvirus. An amino acid sequence of Entomopoxvirus-derived Fusolin is set forth in SEQ ID NO:23.

Crystalline inclusion protein A (CipA) is a constituent protein of a crystalline protein inclusion body of the genus *Photorhabdus*. An amino acid sequence of *Photorhabdus laumondii*-derived CipA is set forth in SEQ ID NO:24.

According to the present specification, the phrase one or a plurality means, for example, 1 to 50 units, for example, 1 to 35 units, for example, 1 to 20 units, for example, 1 to 15 units, for example, 1 to 10 units, and for example, 1 to 5 units.

The crystalline protein may be a variant having a mutation in the above-mentioned cytoplasmic polyhedral protein, nuclear polyhedral protein, insecticidal protein, cathepsin B, luciferase, μNS, CipA, Fusolin, and the like as long as it has a crystal-forming ability. More specifically, the crystalline protein may be, for example, a protein including an amino acid sequence in which one amino acid or a plurality of amino acids have been deleted, substituted, or added in the above-mentioned amino acid sequences set forth in SEQ ID NO:1, SEQ ID NO:2, and SEQ ID NO:18 to SEQ ID NO:24.

Here, the target peptide may be, for example, a peptide whose three-dimensional structure is to be analyzed. As will be described later, the three-dimensional structure of a target peptide can be conveniently analyzed by causing a crystalline protein, which is a fusion protein of the above-mentioned crystalline protein and a target peptide, to be expressed in a cell-free protein synthesis system to form a crystal, and subjecting the crystal of the crystalline protein to an X-ray crystal structure analysis.

In this case, the target peptide may be any peptide in need of analysis of the three-dimensional structure. The amino acid length of the target peptide is preferably, for example, about 5 to 50 amino acids from the viewpoint that the crystalline protein can maintain the crystal-forming ability.

Regarding a method for crystallizing a protein, a method of purifying the protein from cells and then performing crystallization is generally used. According to such a method, a duration of two weeks or longer was required in order to obtain crystals, and a lot of effort was also required.

For example, in order to produce polyhedra crystals, a method of infecting cells with a baculovirus to produce polyhedra crystals in the cells may be adopted. In this case, a duration of about 2 weeks was required to prepare the baculovirus.

On the other hand, in the case of the method for producing a crystal using a cell-free protein synthesis system of the present embodiment, the time required for expressing and crystallizing a crystalline protein is about one day. Furthermore, according to the method for producing a protein crystal of the present embodiment, the operation is very simple and requires little effort.

Furthermore, in the cell-free protein synthesis system, the amount of the synthesis system can be freely set. As will be described later in the Examples, for example, protein crystals can be obtained even when the amount of the reaction solution of the cell-free protein synthesis system is about 22 μL.

The lower limit value of the amount of the reaction solution of the cell-free protein synthesis system is preferably 15 μL or more, more preferably 18 μL or more, even more preferably 20 μL or more, and particularly preferably 22 μL or more. When the amount of the reaction solution is equal to or more than the above-described lower limit value, the shape of the protein crystals can be made more well-regulated.

The upper limit value of the amount of the reaction solution of the cell-free protein synthesis system is not particularly limited, and the amount of the reaction solution can be a liquid amount capable of forming protein crystals. The amount of the reaction solution may be, for example, 5 mL or less, 1 mL or less, 500 μL or less, 200 μL or less, 100 μL or less, 50 μL or less, or 30 μL or less.

When a crystalline protein is synthesized in a cell, it is necessary to synthesize the crystalline protein at a temperature and an environment suitable for the proliferation and growth of the cell. On the other hand, when a crystalline protein is synthesized in a cell-free protein synthesis system, the temperature, environment, and the like can be appropriately set. For example, the quality of the obtained crystals can be enhanced by synthesizing the crystalline protein using a cell-free protein synthesis system at a temperature lower than the general culture temperature for the cells.

Furthermore, as will be described later in the Examples, protein crystals can be obtained, even when the amount of the reaction solution is 20 μL or less, by injecting the reaction solution of the cell-free protein synthesis system into a capillary tube. When protein crystals are obtained using a capillary tube, the amount of the reaction solution to be injected into the capillary tube is preferably 5 μL or more, more preferably 12 μL or more, even more preferably 15 μL or more, and particularly preferably 18 μL or more. When the amount of the reaction solution is equal to or more than the above-described lower limit value, the shape of the protein crystals can be made more well-regulated.

The upper limit value of the amount of the reaction solution of the cell-free protein synthesis system to be injected into the capillary tube is not particularly limited, and the amount of the reaction solution can be a liquid amount which can form protein crystals and can be retained in the capillary tube. The amount of the reaction solution may be, for example, 100 μL or less, 50 μL or less, or 20 μL or less.

In the production method of the present embodiment, a nucleic acid encoding the crystalline protein is added to the protein synthesis system in step (a).

(Nucleic Acid)

According to the present embodiment, the nucleic acid encoding the crystalline protein may be DNA or may be RNA. The base sequence of the nucleic acid encoding the protein may be synonymously substituted such that the expression of the crystalline protein is optimized in the cell-free protein synthesis system that will be described later.

According to the present embodiment, the crystalline protein to be expressed in the same cell-free protein synthesis system may be of one kind or may be of two or more kinds. According to the present embodiment, the nucleic acid to be added to the cell-free protein synthesis system may be of one kind or may be of two or more kinds.

The sequence of DNA may have a promoter for the binding of RNA polymerase upstream of the sequence encoding the crystalline protein. The promoter may be a promoter having activity in the protein synthesis system or may be an expression-inducing promoter whose activity can be induced by a drug or the like. The promoter is not particularly limited, and examples thereof include T3, T7, and SP6 promoters, cytomegalovirus promoter (CMV promoter), and CMV early enhancer/chicken beta actin (CAG promoter). Examples of the expression-inducing promoter include a doxycycline-induced promoter (TetO promoter), whose promoter activity can be artificially controlled.

The above-mentioned RNA may have a ribosome-binding site upstream of the sequence encoding the crystalline protein. Examples of the ribosome-binding site include Shine-Dalgarno sequence, Kozak sequence, and internal ribosome entry site (IRES); however, sequences known to those ordinarily skilled in the art can be used without limitations.

In step (b) of the present embodiment, the protein synthesis system is incubated for a predetermined time until the crystalline protein encoded by the added nucleic acid is expressed and the expressed protein completes the formation of crystals. Here, the predetermined time may be 10 minutes or more, 30 minutes or more, 1 hour or more, 3 hours or more, 6 hours or more, 12 hours or more, 24 hours or more, 32 hours or more, or 48 hours or more. The predetermined time may be 64 hours or less, 48 hours or less, 32 hours or less, 24 hours or less, 12 hours or less, 6 hours or less, 3 hours or less, 1 hour or less, or 30 minutes or less. The upper limit value and the lower limit value of the predetermined time can be discretionarily selected.

In step (b) of the present embodiment, the temperature of the protein synthesis system may be, for example, 3° C. or higher, 4° C. or higher, 10° C. or higher, 15° C. or higher, or 20° C. or higher. Furthermore, the temperature may be, for example, 35° C. or lower, 30° C. or lower, 25° C. or lower, 20° C. or lower, 15° C. or lower, 10° C. or lower, or 5° C. or lower. The upper limit value and the lower limit value of the temperature can be discretionarily selected.

When the reaction solution of the cell-free protein synthesis system is incubated for a predetermined time, protein crystals are formed on the bottom of the container holding the reaction solution. The formed crystals can be easily collected by an operation such as centrifugation.

(Cell-Free Protein Synthesis System)

According to the present embodiment, the protein synthesis system is a cell-free protein synthesis system. It is meant by a cell-free protein synthesis system that proteins are not intracellularly synthesized but are synthesized in vitro from nucleic acids that serve as templates, by using ribosomes, transcriptional/translation factors, and the like, which are derived from living cells or artificially synthesized.

The cell-free protein synthesis system of the present embodiment may be a synthesis system including a transcription process in addition to the translation process. When the nucleic acid encoding the protein having a crystal-forming ability of the present embodiment is DNA, it is necessary to synthesize RNA encoding the protein having a crystal-forming ability, by transcribing the DNA.

A step of transcribing DNA may be included in step (b) of the present embodiment. That is, the cell-free protein synthesis system of the present embodiment may include a factors that enable transcription. Examples of the factors that enable transcription include RNA polymerases and nucleotides; however, factors known to those ordinarily skilled in the art can be used without limitations.

Furthermore, the above-mentioned process of transcribing RNA from DNA does not have to be included in the process of the present embodiment. That is, RNA may be synthesized in advance using a DNA encoding a crystalline protein as a template, and the RNA may be added to the cell-free protein synthesis system of the present embodiment. Furthermore, instead of using the DNA encoding the crystalline protein, it is also acceptable to use an artificially chemically synthesized RNA encoding the crystalline protein.

The cell-free protein synthesis system is not particularly limited, and examples thereof include a synthesis system that utilizes a cell extract obtained from wheat germ, yeast, insect cells, cultured mammalian cells, rabbit reticulocytes, *Escherichia coli*, or the like; and a synthesis system in which factors required for translation have been reconstituted. The cell-free protein synthesis system used in the present embodiment is not limited to the above-mentioned methods, and known methods can be used (see, for example, Japanese Unexamined Patent Application, First Publication No. 2019-083825).

A cell extract used in the cell-free protein synthesis system may include, for example, tRNA, aminoacylation tRNA synthetase, a translation initiation factor, a translation elongation factor, and a translation termination factor, as factors involved in translation.

The efficiency of protein synthesis may be increased by continuously adding, for example, amino acids and energy molecules (ATP, GTP) to the cell extract. Furthermore, for example, an energy regeneration system, salts, creatine phosphate, and an enzyme may be added to the cell extract as needed.

The synthesis system in which factors required for translation have been reconstituted is not particularly limited, and for example, a known method can be used. (For example, Shimizu, Y. et al., Cell-free translation reconstituted with purified components, Nature Biotech., 19, 751-755, 2001). The reconstitution type synthesis system may include, for example, a translation initiation factor, a translation elongation factor, a termination factor, aminoacylation tRNA synthetase, and methionyl-tRNA formyltransferase.

For example, the following operations may be carried out using the cell-free protein synthesis system. As described above, factors that regulate translation may be added to the cell-free protein synthesis system as necessary. Furthermore, the pH, salt concentration, and the like of the synthesis system can be changed as necessary.

Furthermore, as will be described later, a target substance can be enclosed in the polyhedra by adding the target substance to the cell-free protein synthesis system.

Furthermore, by adding, for example, an unnatural amino acid, a radiolabeled amino acid, and the like to the cell-free protein synthesis system, the unnatural amino acid and the radiolabeled amino acid can be incorporated into the polyhedrin protein of the polyhedra.

In addition, compounds harmful and toxic to cells can also be added to the cell-free protein synthesis system.

Furthermore, when the cell-free protein synthesis system is used, a large quantity of crystalline proteins can be synthesized. As described above, for example, by adding a factor that enhances the efficiency of protein synthesis to the cell-free protein synthesis system, a large quantity of crystalline proteins can be synthesized.

The crystalline protein described above may be one selected from the group consisting of the following (i), (ii), (iii), and (iv):
  (i) a protein including an amino acid sequence set forth in SEQ ID NO:1, or a protein including an amino acid sequence in which one amino acid or a plurality of amino acids have been deleted, substituted, or added in the amino acid sequence set forth in SEQ ID NO:1, the protein having a polyhedron-forming ability;
  (ii) a protein including an amino acid sequence set forth in SEQ ID NO:2, or a protein including an amino acid sequence in which one amino acid or a plurality of amino acids have been deleted, substituted, or added in the amino acid sequence set forth in SEQ ID NO:2, the protein having a crystal-forming ability;

(iii) a protein including an amino acid sequence set forth in SEQ ID NO:18, or a protein including an amino acid sequence in which one amino acid or a plurality of amino acids have been deleted, substituted, or added in the amino acid sequence set forth in SEQ ID NO:18, the protein having a crystal-forming ability; and (iv) a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a protein including an amino acid sequence in which one amino acid or a plurality of amino acids have been deleted, substituted, or added in the fusion protein, the protein having a polyhedron-forming ability.

These will be described in detail.

According to the present specification, the phrase one or a plurality means, for example, 1 to 50 units, for example, 1 to 35 units, for example, 1 to 20 units, for example, 1 to 15 units, for example, 1 to 10 units, and for example, 1 to 5 units.

First Embodiment

The crystalline protein may be the following (i).
(i) a protein including an amino acid sequence set forth in SEQ ID NO:1, or a protein including an amino acid sequence in which one amino acid or a plurality of amino acids have been deleted, substituted, or added in the amino acid sequence set forth in SEQ ID NO:1, the protein having a polyhedron-forming ability;

The protein including the amino acid sequence set forth in SEQ ID NO:1 is wild-type polyhedrin protein expressed by Cytoplasmic Polyhedrosis Virus (CPV) that infects silkworm moth. Wild-type polyhedrin protein has a polyhedron-forming ability of forming polyhedra by spontaneously self-assembling.

As will be described later in Examples, a polyhedra protein crystal can be produced by causing the crystalline protein of the above-described item (i) to be expressed in the above-mentioned cell-free protein synthesis system and incubating the cell-free protein synthesis system.

Second Embodiment

The crystalline protein may be the following (ii).
(ii) a protein including an amino acid sequence set forth in SEQ ID NO:2, or a protein including an amino acid sequence in which one amino acid or a plurality of amino acids have been deleted, substituted, or added in the amino acid sequence set forth in SEQ ID NO:2, the protein having a polyhedron-forming ability;

The protein including the amino acid sequence set forth in SEQ ID NO:2 is wild-type polyhedrin protein expressed by nuclear polyhedrosis virus (Nucleopolyhedrovirus, NPV) that infects *Autographa californica*, which is a type of moth. This wild-type polyhedrin protein has a crystal-forming ability to form protein crystals by spontaneous self-assembling.

A polyhedra protein crystal can be produced by causing the crystalline protein of the above-described item (ii) to be expressed in the above-mentioned cell-free protein synthesis system and incubating the cell-free protein synthesis system.

Third Embodiment

The crystalline protein may be the following (iii).
(iii) a protein including an amino acid sequence set forth in SEQ ID NO:18, or a protein including an amino acid sequence in which one amino acid or a plurality of amino acids have been deleted, substituted, or added in the amino acid sequence set forth in SEQ ID NO:18, the protein having a crystal-forming ability; and The protein including the amino acid sequence set forth in SEQ ID NO:18 is Cry3A protein produced by *Bacillus thuringiensis*. Wild-type Cry3A protein has a crystal-forming ability of forming protein crystals by spontaneously self-assembling.

As will be described later in Examples, crystals of the crystalline protein can be produced by causing the crystalline protein of the above-described item (iii) to be expressed in the above-mentioned cell-free protein synthesis system and incubating the cell-free protein synthesis system.

Fourth Embodiment

The crystalline protein may be the following (iv).
(iv) a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a protein including an amino acid sequence in which one amino acid or a plurality of amino acids have been deleted, substituted, or added in the fusion protein, the protein having a polyhedron-forming ability.

A crystal structure analysis of the target peptide can be easily performed by analyzing the crystal structure of polyhedra obtained by crystallizing the fusion protein of the present embodiment.

Furthermore, the size of the polyhedra crystals can be controlled by appropriately designing the amino acid sequence of the target peptide.

The number of amino acids in the amino acid sequence of the target peptide may be, for example, 5 to 25 residues, may be 7 to 23 residues, or may be 9 to 18 residues.

Examples of the fusion protein of the present embodiment include fusion proteins including amino acid sequences set forth in SEQ ID NO:8 to SEQ ID NO:10, SEQ ID NO:12, and SEQ ID NO:15, as will be described later in Examples. The amino acid sequences of these fusion proteins will be described in detail.

The fusion protein of SEQ ID NO:8 is a fusion protein in which an amino acid sequence of the 70th amino acid to the 77th amino acid of the amino acid sequence set forth in SEQ ID NO:1 has been substituted with a target peptide including an amino acid sequence set forth in SEQ ID NO:7.

The fusion protein of SEQ ID NO:9 is a fusion protein in which two amino acid residues have been added on the N-terminal side of the target peptide and one amino acid residue has been added on the C-terminal side of the target peptide in the fusion protein of SEQ ID NO:8.

The fusion protein of SEQ ID NO:10 is a fusion protein in which three amino acid residues have been added on the N-terminal side of the target peptide and three amino acid residues have been added on the C-terminal side of the target peptide in the fusion protein of SEQ ID NO:8.

The fusion protein of SEQ ID NO:12 is a fusion protein in which four amino acid residues have been added on the N-terminal side of the target peptide and four amino acid residues have been added on the C-terminal side of the target peptide in the fusion protein of SEQ ID NO:8.

The fusion protein of SEQ ID NO:15 is a fusion protein in which four amino acid residues have been added on the N-terminal side of the target peptide and four amino acid residues have been added on the C-terminal side of the target peptide in the fusion protein of SEQ ID NO:8.

As will be described later in Examples, a polyhedra crystals formed from the protein of SEQ ID NO:12 has a size of about 400 nm, which is smaller compared with the size of a crystal formed from wild-type polyhedrin protein.

Fifth Embodiment

According to an embodiment, the present invention provides a method for producing a protein crystal, in which the crystalline protein is the above-described item (i) or the above-described item (iv), and in step (a), a nucleic acid encoding a fusion protein in which a target peptide is bound to the C-terminus of an amino acid sequence set forth in SEQ ID NO:4 or to the C-terminus of an amino acid sequence in which one amino acid or a plurality of amino acids have been deleted, substituted, or added in the amino acid sequence set forth in SEQ ID NO:, is further added to a cell-free protein synthesis system.

The amino acid sequence set forth in SEQ ID NO:4 is an H1α-helix region of wild-type cytoplasmic polyhedral protein.

According to the present embodiment, when a fusion protein and a protein having a polyhedron-forming ability are expressed by a cell-free protein synthesis system, these proteins form a polyhedron, and the fusion protein can form a portion of the polyhedron.

When the target peptide bound to the C-terminus of the fusion protein binds and the protein having a polyhedron-forming ability forms a polyhedron, the target peptide is enclosed in the polyhedron. As will be described later in Examples, when GFP is used as the target peptide is GFP, the polyhedron crystal can enclose GFP.

The sequence of the target peptide is not particularly limited. The number of residues in the amino acid sequence of the target peptide is preferably 3 to 500 residues, more preferably 3 to 400 residues, and even more preferably 3 to 300 residues.

Sixth Embodiment

The crystalline protein may be a modified polyhedrin protein in which at least a portion of the amino acid sequence has been deleted from the protein of the following (v) or (vi), the modified polyhedrin protein having a polyhedron-forming ability.
  (v) Wild-type polyhedrin protein
  (vi) A protein including an amino acid sequence in which one amino acid or a plurality of amino acids have been deleted, substituted, or added in the amino acid sequence of wild-type polyhedrin protein, the protein having a polyhedron-forming ability.

The wild-type polyhedrin protein may be a wild-type polyhedrin protein expressed by CPV or a wild-type polyhedrin protein expressed by NPV.

More specifically, the wild-type polyhedrin protein may be, for example, a protein including an amino acid sequence set forth in SEQ ID NO:1 or a protein including an amino acid sequence set forth in SEQ ID NO:2.

A polyhedron obtained by crystallizing the modified polyhedrin protein of the present embodiment has a space inside. Therefore, it is easy to enclose a larger molecule, for which it has been hitherto difficult to be enclosed. According to the present specification, it should be noted that peptides include proteins.

According to the present embodiment, the modified polyhedrin protein may be a protein in which at least a portion of the amino acid sequence has been deleted from the wild-type polyhedrin protein.

Furthermore, according to the present embodiment, the modified polyhedrin protein may be a protein in which at least a portion of the amino acid sequence has been deleted from a protein including an amino acid sequence in which one amino acid or a plurality of amino acids have been deleted, substituted, or added in the amino acid sequence of the wild-type polyhedrin protein, the protein having a polyhedron-forming ability.

The total length of the at least portion of the amino acid sequence thus deleted may be 30 amino acids or more, may be 35 amino acids or more, or may be 40 amino acids or more. When more amino acids can be deleted while maintaining the polyhedron-forming ability, the space inside a polyhedron can be made larger.

The upper limit of the total length of the at least portion of the amino acid sequence thus deleted may be a length of the extent that the modified polyhedrin protein can maintain the polyhedron-forming ability, and the upper limit may be 100 amino acids for example, may be 80 amino acids for example, or may be 50 amino acids for example.

Furthermore, the deleted amino acid sequence may be at one location or may be at two or more locations, as long as the polyhedron-forming ability is maintained. That is, in the amino acid sequence of the wild-type polyhedrin protein that is the basis of the modified polyhedrin protein, the deleted amino acid sequence may be an amino acid sequence region at one continuous location, or amino acid sequence regions at two or more separated locations.

The wild-type polyhedrin protein that is the basis of the modified polyhedrin protein of the present embodiment is not particularly limited as long as it is a polyhedrin protein that forms a polyhedron, and may be, for example, a protein including an amino acid sequence set forth in SEQ ID NO:1.

A more specific example of the modified polyhedrin protein of the present embodiment may be, for example, a protein including an amino acid sequence set forth in SEQ ID NO:3, or a protein including an amino acid sequence in which one amino acid or a plurality of amino acids have been deleted, substituted, or added in the amino acid sequence set forth in SEQ ID NO:3, the protein having a polyhedron-forming ability.

The amino acid sequence set forth in SEQ ID NO:3 is a sequence in which 38 residues including from the 67th alanine residue to the 104th alanine residue have been deleted from the amino acid sequence set forth in SEQ ID NO:1.

Seventh Embodiment

The above-mentioned crystalline protein may be a fusion protein in which a target peptide has been added between the 66th and 67th amino acids of the amino acid sequence set forth in SEQ ID NO:3, the fusion protein having a polyhedron-forming ability; or a fusion protein including an amino acid sequence in which one amino acid or a plurality of amino acids have been deleted, substituted, or added in the above-described fusion protein, the fusion protein having a polyhedron-forming ability.

The fusion protein of the present embodiment is a fusion protein of the above-mentioned modified polyhedrin protein and a target peptide. Furthermore, in the fusion protein of the present embodiment, the target peptide is added in the region where some amino acids have been deleted from the wild-type polyhedrin protein that is the basis of the modified polyhedrin protein.

On the inside of a polyhedron obtained by crystallizing the fusion protein of the present embodiment, target peptides are regularly disclosed. Therefore, a crystal structure analysis of the target peptide can be easily carried out using the fusion protein of the present embodiment.

Eighth Embodiment

The above-mentioned crystalline protein may be a protein that has a site including an amino acid having a property of coordinating to a metal atom and has a polyhedron-forming ability, and the target molecule may be a substance containing a metal atom. The site including an amino acid having a property of coordinating to a metal atom may be located at the C-terminus of the above-mentioned protein.

Examples of the amino acid having a property of coordinating to a metal atom include histidine, glutamic acid, aspartic acid, cysteine, and serine. The site including an amino acid having a property of coordinating to a metal atom may be a site including one or more amino acids selected from the above-mentioned amino acids, and examples include a site in which about six histidines are contiguously arranged; a site where an amino acid having a property of coordinating to a metal atom is exposed in the space inside a crystal of a polyhedron; and a site where an amino acid having a property of coordinating to a metal atom is exposed on the crystal surface of a polyhedron.

Ninth Embodiment

The cell-free protein synthesis system may include a target molecule having a molecular weight of 10 to 100,000.

By causing the above-mentioned crystalline protein to be expressed in the cell-free protein synthesis system including a target molecule, the target molecule can be enclosed in a crystal of the above-mentioned crystalline protein.

As described above, the target molecule can also be bound to the surface of a polyhedron by modifying the amino acid sequence of the protein having a polyhedron-forming ability.
(Target Molecule)

The molecular weight of the target molecule is preferably 10 to 100,000, more preferably 10 to 60,000, and even more preferably 10 to 30,000. When the molecular weight of the target molecule is within the above-mentioned range, the target molecule is likely to be enclosed in the polyhedron crystal.

The target molecule is not particularly limited, and examples thereof include an inorganic substance, an organic substance, and a substance containing a metal atom. The organic substance may be, for example, a peptide, a protein, fluorescein, or the like.

Examples of the substance containing a metal atom include a metal complex, a metal atom-containing protein, and a metal atom-containing organic compound.

The metal complex may be a substance containing one or more metal atoms selected from copper, nickel, zinc, cobalt, manganese, iron, ruthenium, rhenium, and the like, and examples thereof include $Mn(CO)_5Br$, $Mn(CO)_5Cl$, $Ru_2(CO)_6Cl_4$, $Fe_3(CO)_{12}$, and $Re(CO)_5Cl$.

Examples of the metal atom-containing protein include cytochrome P450, heme proteins typified by hemoglobin, superoxide dismutase (SOD), and non-heme proteins typified by alcohol dehydrogenase.

Examples of the metal atom-containing organic compound include protoporphyrin and chlorophyll.
[Fusion Protein]

According to an embodiment, the present invention provides a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a fusion protein including an amino acid sequence in which one amino acid or a plurality of amino acids have been deleted, substituted, or added in the above-described fusion protein, the fusion protein having a polyhedron-forming ability.

The fusion protein of the present embodiment is the same as the fusion protein described above in the third embodiment of the method for producing a crystal.

A crystal structure analysis of the target peptide can be easily performed by analyzing the crystal structure of polyhedra obtained by crystallizing the fusion protein of the present embodiment.

Furthermore, the size of the polyhedra crystals can be controlled by appropriately designing the amino acid sequence of the target peptide.
[Polyhedron]

According to an embodiment, the present invention provides a polyhedron crystal in which the fusion protein described above in [Fusion Protein] has been crystallized. When the fusion protein of the present embodiment is expressed in a cell-free protein synthesis system as described above or in a cell, the fusion protein forms a polyhedron crystal.
[Polyhedron-Target Molecule Complex]

According to an embodiment, the present invention provides a polyhedron-target molecule complex in which a target molecule is enclosed in the crystal structure of the polyhedron described above in [Polyhedron]. When a polyhedron crystal is formed from the above-mentioned fusion protein, by bringing the target molecule into contact with the fusion protein, a polyhedron-target molecule complex in which the target molecule is enclosed in the crystal structure of the polyhedron can be obtained.
[Nucleic Acid]

According to an embodiment, the present invention provides a nucleic acid encoding the fusion protein described above in [Fusion Protein]. According to the present embodiment, the nucleic acid may be RNA or may be DNA.
[Kit for Producing Cell-Free System Crystal]

According to an embodiment, the present invention provides a kit for producing a cell-free system crystal, the kit including: a nucleic acid encoding a crystalline protein; and a reagent for a cell-free protein synthesis system.

A cell-free protein synthesis system can be conveniently prepared by using the reagent attached to the kit of the present embodiment. Examples of the cell-free protein synthesis system include those described above in [Production method]. The cell-free protein synthesis system may be a synthesis system that utilizes a cell extract or may be a synthesis system in which factors required for translation have been reconstituted.

When the cell-free protein synthesis system is a synthesis system that utilizes a cell extract, the kit may include a cell extract as reagent for the cell-free protein synthesis system attached to the kit. The biological species of the cells from which the cell extract is derived is not particularly limited, and the above-mentioned ones in [Production method] may be mentioned.

When the cell-free protein synthesis system is a synthesis system in which the factors required for translation have been reconstituted, the kit may include the factors required for translation. The biological species from which the factors required for translation are derived is not particularly limited.

The kit of the present embodiment may include factors that increase the efficiency of protein synthesis, such as amino acids and energy molecules. Examples of the factors for increasing the efficiency of protein synthesis include the ones mentioned above in [Production method].

The nucleic acid included in the kit of the present embodiment may be RNA or may be DNA. The sequence of the above-mentioned nucleic acid encoding the protein may be synonymously substituted such that the expression of the protein is optimized in the cell-free protein synthesis system.

When the nucleic acid is DNA, the DNA may be linear or may be circular. A circular DNA may be, for example, an expression vector such as a plasmid. A plasmid may have a promoter upstream of the above-mentioned DNA sequence encoding the protein or may have a ribosome-binding site.

The kit of the present embodiment may include factors required for transcription. Examples of the factors required for transcription include the factors described above in [Production method]. When the nucleic acid encoding the protein is DNA, RNA can be synthesized by transcription using the factors required for transcription that are included in the kit of the present embodiment.

First Embodiment

According to the kit of the present embodiment, the crystalline protein may be a protein according to any one of the following (A) to (C):

(A) a cytoplasmic polyhedral protein, a nuclear polyhedral protein, an insecticidal protein, cathepsin B, luciferase, reovirus nonstructural protein (µNS), CipA, or fusolin protein (Fusolin);

(B) a protein including an amino acid sequence in which one amino acid or a plurality of amino acids have been deleted, substituted, or added in an amino acid sequence of the protein of (A), the protein having a crystal-forming ability; and (C) a fusion protein of the protein of (A) or (B) and a target peptide.

For example, by adding a nucleic acid encoding the above-mentioned crystalline protein attached to the kit of the present embodiment, to the cell-free protein synthesis system attached to the kit of the present embodiment, the crystalline protein is synthesized, and thereby protein crystals can be easily produced.

Second Embodiment

According to the kit of the present embodiment, the crystalline protein may be one selected from the group consisting of the following (i), (ii), (iii), and (iv):

(i) a protein including an amino acid sequence set forth in SEQ ID NO:1, or a protein including an amino acid sequence in which one amino acid or a plurality of amino acids have been deleted, substituted, or added in the amino acid sequence set forth in SEQ ID NO:1, the protein having a polyhedron-forming ability;

(ii) a protein including an amino acid sequence set forth in SEQ ID NO:2, or a protein including an amino acid sequence in which one amino acid or a plurality of amino acids have been deleted, substituted, or added in the amino acid sequence set forth in SEQ ID NO:2, the protein having a polyhedron-forming ability;

(iii) a protein including an amino acid sequence set forth in SEQ ID NO:18, or a protein including an amino acid sequence in which one amino acid or a plurality of amino acids have been deleted, substituted, or added in the amino acid sequence set forth in SEQ ID NO:18, the protein having a crystal-forming ability; and (iv) a fusion protein in which an amino acid sequence of the 70th amino acid to the 77th amino acid of the amino acid sequence set forth in SEQ ID NO:1 has been substituted with a target peptide, the fusion protein having a polyhedron-forming ability, or a protein including an amino acid sequence in which one amino acid or a plurality of amino acids have been deleted, substituted, or added in the fusion protein, the protein having a polyhedron-forming ability.

For example, by adding a nucleic acid encoding the above-mentioned crystalline protein attached to the kit of the present embodiment, to the cell-free protein synthesis system attached to the kit of the present embodiment, the crystalline protein is synthesized, and thereby protein crystals can be easily produced.

Third Embodiment

When the kit of the present embodiment includes a nucleic acid encoding the above-mentioned item (i) or (iv), the kit of the present embodiment may further include a nucleic acid encoding a fusion protein in which a target peptide is bonded to the C-terminus of an amino acid sequence set forth in SEQ ID NO:4 or to the C-terminus of an amino acid sequence in which one amino acid or a plurality of amino acids have been deleted, substituted, or added in the amino acid sequence set forth in SEQ ID NO:4.

By adding the nucleic acid attached to the present embodiment to the cell-free protein synthesis system attached to the kit of the present embodiment, a protein having a polyhedron-forming ability and a fusion protein are expressed, these form a polyhedron crystal, and the fusion protein can form a portion of the polyhedron crystal.

Polyhedra crystals produced by the above-mentioned production method can be collected by, for example, centrifuging the reaction solution of the translation reaction.

The polyhedra crystals can be stored in distilled water or in a solution such as a buffered saline solution or distilled water including antibiotics.

Since the target molecule enclosed in the polyhedron is protected by the polyhedron, by enclosing the target molecule in a polyhedron-target molecule complex, stability against ultraviolet radiation, heat, drying, immersion in a urea solution, immersion in an acid, immersion in a solution including a surfactant, and the like can be enhanced.

Furthermore, since the polyhedron-target molecule complex has cell affinity (low biotoxicity), the polyhedron-target molecule complex can be applied to the storage and controlled release of a metal-containing drug and the control of reactions of small molecules in vivo.

The control of reactions of small molecules includes capture of small molecules, release of small molecules, synthesis of small molecules, breakdown of small molecules, and the like.

Furthermore, for example, the target molecule can be released in a controlled manner by changing the pH of the solution including the polyhedron to be, for example, 10 or higher. In addition to changes in the pH, by enclosing a target molecule that releases an active substance by light irradiation, temperature changes, and addition of active molecules, in the complex, controlled release of the active substance by light irradiation, temperature changes, and addition of active molecules is enabled. Examples of the target molecule that releases a substance by light irradiation include $Mn(CO)_5Br$. $Mn(CO)_5Br$ releases CO by light irradiation.

By the way, it is known that gas molecules such as CO, NO, and $O_2$ are greatly involved in cerebral infarction, Alzheimer's disease, carcinogenesis, and liver diseases. These gas molecules infiltrate into cells and affect neurotransmission, transcription factor activity, and the like.

Conventionally, it has been reported that CO-releasing materials were supported on polymers, gels, or porous materials, and release of CO at normal temperature and normal pressure and release of CO in water were performed; however, there is a problem that the materials are biotoxic and the synthesis process is complicated. In contrast, the polyhedron-target molecule complex has cell affinity and is easily produced.

For example, a new material having cell affinity and capable of controlled release of gas molecules can be provided by polyhedra that enclose materials for releasing gas molecules such as CO, NO, or $O_2$ as target molecules. By incorporating such a material into, for example, an evaluation system established by iPS cells or ES cells, the material can be utilized for the development of pharmaceutical products for cerebral infarction, Alzheimer's disease, carcinogenesis, liver diseases, and the like.

According to the present invention, as described above, polyhedra can be crystallized by causing polyhedrin protein to be expressed in an extremely small amount, such as about 50 μL, of the reaction solution. Therefore, operations including from expression to crystallization of polyhedrin protein can be carried out in the wells of 24-wells, 96-wells, and 384-wells.

Since a large number of samples on a small scale such as described above can be simultaneously handled, it is possible to verify the effect of a drug with high throughput by using crystallized polyhedra. For example, it becomes possible to efficiently screen active drugs by enclosing a target substance in polyhedra and allowing a library of drug candidates to act on the target substance enclosed in the polyhedra under appropriate conditions.

EXAMPLES

Hereinafter, the present invention will be described by way of Examples; however, the present invention is not intended to be limited to the following Examples.

Experimental Example 1

(Crystallization of Wild-Type Polyhedrin by Cell-Free Protein Synthesis System)

A wheat germ cell-free protein synthesis system was used to express wild-type polyhedrin of CPV, and polyhedra crystals were formed.

For the wheat germ cell-free protein synthesis system, SUB-AMIX SGC, WEPRO 9240, and pEU-E01-MCS vectors manufactured by CellFree Sciences Co., Ltd. were used.

First, a cDNA encoding the wild-type polyhedrin protein set forth in SEQ ID NO:1 was added into the pEU-E01-MCS vector, and an expression vector was obtained. 2 μg of the obtained expression vector was prepared, this was added to a Transcription Premix LM tube and then incubated at 37° C. for 6 hours to synthesize mRNA, and a transcription reaction solution was obtained.

The transcription reaction solution was placed on the bottom of wells containing the SUB-AMIX SGC to form a layer in the wells. Subsequently, the mixture was kept warm at 15° C. for 20 hours, a translation reaction was carried out, and wild-type polyhedrin was synthesized.

One day after the initiation of the translation reaction, crystals formed at the bottom of the wells were observed. The results are shown in FIG. 1. FIG. 1 is a photograph of wild-type polyhedrin crystals obtained by a cell-free protein synthesis system. As a result, it was found that crystals are obtained in just one day by means of a cell-free protein synthesis system, by a simple operation as described above.

Subsequently, the obtained crystals were observed by scanning electron microscopy (SEM). The results are shown in FIG. 2. Furthermore, crystals were similarly produced by changing the temperature at the time of the translation reaction to 20° C., and the obtained crystals were observed by SEM. The results are shown in FIG. 3.

As a result, the size of the crystals obtained by performing the translation reaction at 15° C. and 20° C. was 0.5 μm to 1.5 μm. Furthermore, no significant difference in the size and shape of the crystals was recognized between the case where the translation reaction was carried out at 15° C. and the case where the translation reaction was carried out at 20° C.

Regarding a method for crystallizing a protein, a method of purifying the protein from cells and then performing crystallization is generally used. According to such a method, a duration of two weeks or longer was required in order to obtain crystals, and a lot of effort was also required.

Furthermore, in order to produce polyhedra crystals, a method of infecting cells with a baculovirus to produce polyhedra crystals in the cells may be employed. In this case, a duration of about 2 weeks was required to prepare the baculovirus.

On the other hand, according to the method for producing a crystal of the present invention, as illustrated in Experimental Example 1, it was found that crystallization can be achieved in a short time of about one day by a very simple method.

Experimental Example 2

(X-Ray Structural Analysis of Crystal Obtained by Cell-Free Protein Synthesis System)

For the wild-type polyhedrin crystal of CPV obtained in Experimental Example 1, the three-dimensional structure was analyzed by X-ray structural analysis. The resolution was set to 2.5 Å. The results are shown in FIG. 4.

As a result, the three-dimensional structure of the wild-type polyhedrin crystal obtained by the cell-free protein synthesis system was not significantly different from the three-dimensional structure of the wild-type polyhedrin crystal synthesized by a conventional method, that is, intracellularly. Furthermore, even when the resolution was set to 1.70 Å, the three-dimensional structure could be analyzed.

Experimental Example 3

(Crystallization Conditions for Crystal Obtained by Cell-Free Protein Synthesis System)

The amount of solution from which wild-type polyhedrin crystals of CPV having a well-regulated shape were obtained was investigated by adjusting the amount of the solution after the translation reaction obtained in Experimental Example 1.

Figure 5A:
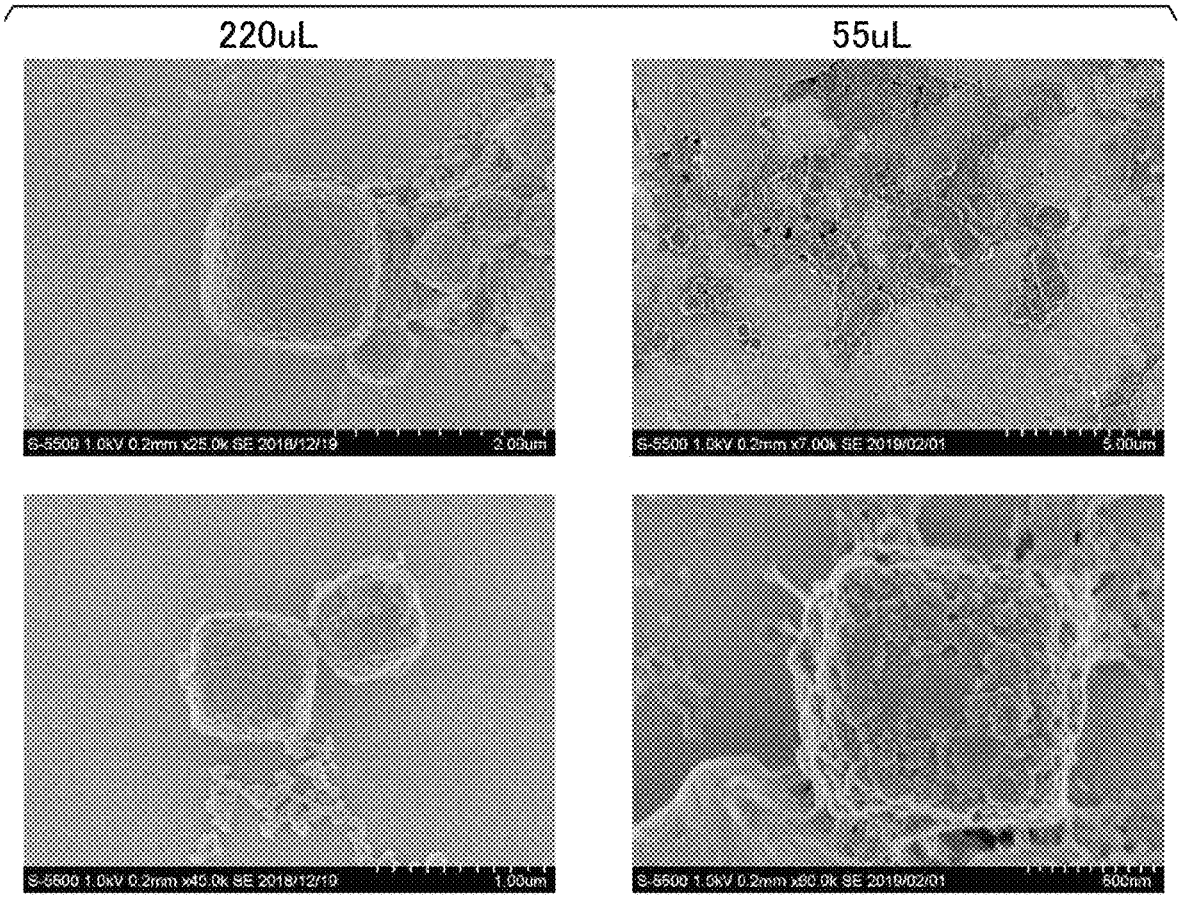
FIG. 5A is SEM images of crystals obtained from 220 µL of a solution and 55 µL of the solution.
Figure 5B:
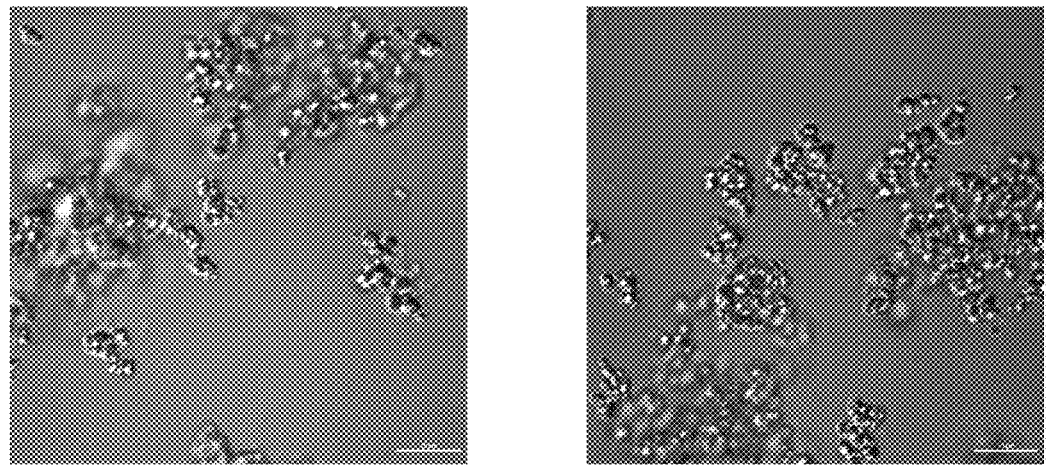
FIG. 5B is optical microscopic images of crystals obtained from 22 µL of the solution.
Figure 5C:
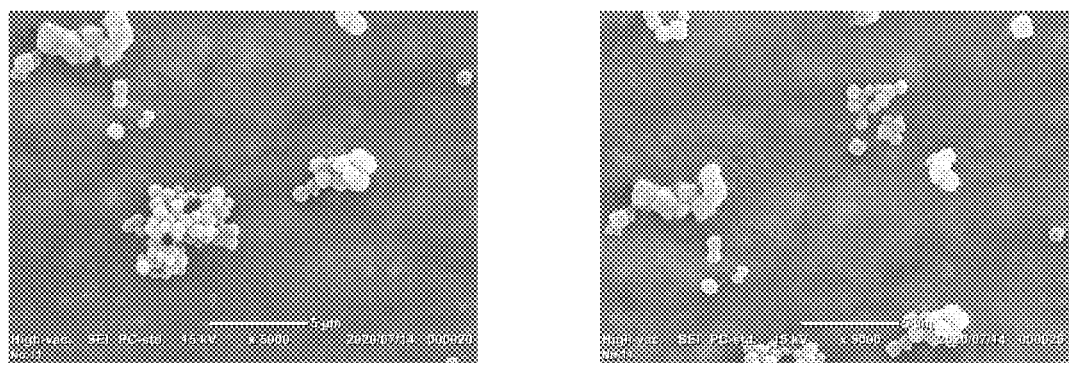
FIG. 5C is SEM images of crystals obtained from 22 µL of the solution.
Figure 6A:
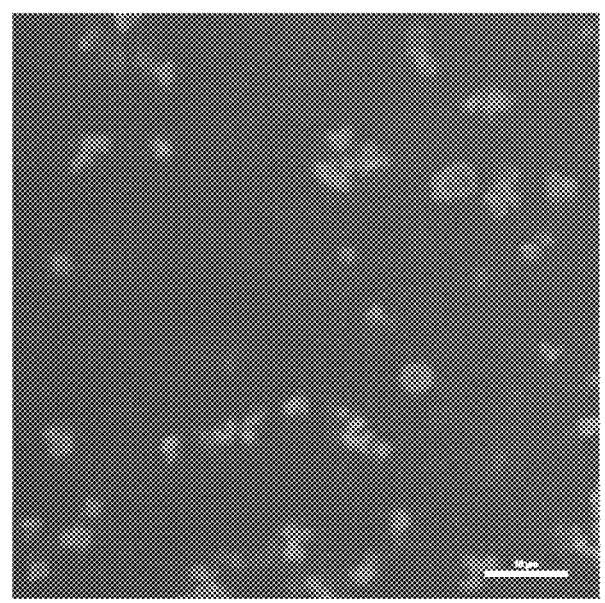
FIG. 6A is a fluorescence image of GFP captured by irradiating polyhedra crystals enclosing GFP, with excitation light.
Figure 6B:
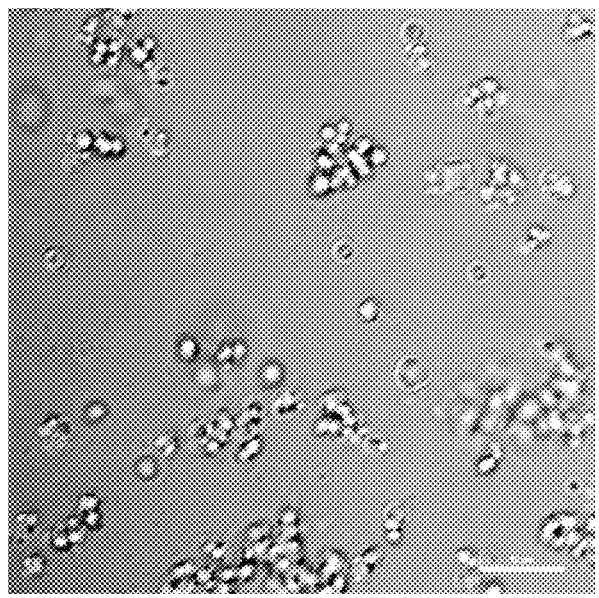
FIG. 6B is a result obtained by superimposing a bright field image and a fluorescence image of the crystals.
Figure 7:
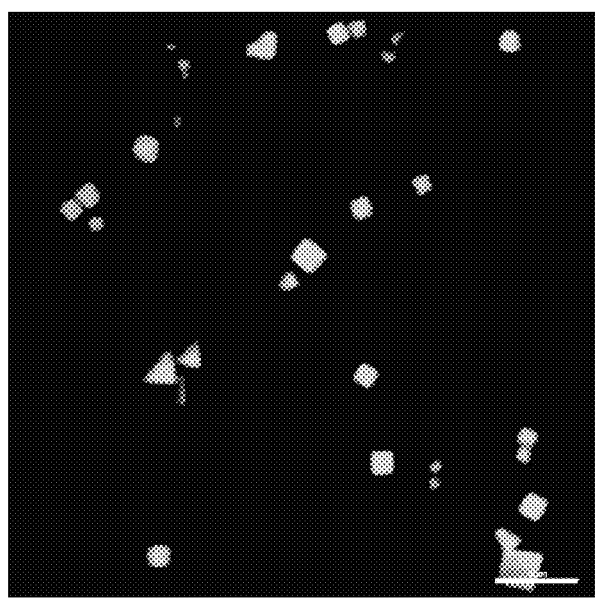
FIG. 7 is a fluorescence image captured by irradiating polyhedra crystals enclosing fluorescein, with excitation light.

Specifically, the morphology of each crystal obtained from solutions (220 μL, 55 μL, 22 μL) after the translation reaction as obtained in Experimental Example 1 was observed by optical microscopy or SEM. The results are shown in FIG. 5A to FIG. 5C. FIG. 5A is SEM images of crystals obtained from 220 μL of the solution and 55 μL of the solution. FIG. 5B is optical microscopic images of crystals obtained from 22 μL of the solution, and FIG. 5C is SEM images of crystals obtained from 22 μL of the solution.

As a result, crystals having a well-regulated cubic shape were obtained from 220 μL of the solution after the translation reaction. Furthermore, crystals having a cubic shape were also obtained from 55 μL of the solution and 22 μL of the solution after the translation reaction.

Experimental Example 4

(Crystallization of Polyhedrin Fragment-GFP Fusion Protein)

A fusion protein obtained by fusing a fragment of polyhedrin protein of CPV with -GFP, and wild-type polyhedrin protein of CPV were co-expressed by a cell-free protein synthesis system to prepare polyhedra crystals enclosing GFP.

cDNA encoding the GFP fusion protein set forth in SEQ ID NO:5 and cDNA encoding the wild-type polyhedrin protein set forth in SEQ ID NO:1 were each added into a pEU-E01-MCS vector in the same manner as in Experimental Example 1, and expression vectors were produced.

Crystals were produced through expression by a cell-free protein synthesis system in the same manner as in Experimental Example 1. A fusion protein set forth in SEQ ID NO:5 is a protein in which GFP protein is fused to the C-terminal side of the H1 α-helix located at the N-terminus of wild-type polyhedrin protein.

Crystals formed in the solution after the translation reaction were observed. The results are shown in FIG. 6. FIG. 6A is a fluorescence image of GFP taken by irradiating crystals with excitation light. FIG. 6B is the result of superimposing a bright field image and a fluorescence image of the crystals.

As a result, it was found that polyhedra crystals enclosing GFP were obtained.

Experimental Example 5

(Crystallization of Polyhedron Enclosing Fluorescein)

Crystals of a polyhedron enclosing fluorescein were produced by causing the wild-type polyhedrin protein of CPV to be expressed by a cell-free protein synthesis system including fluorescein.

The expression vector expressing the wild-type polyhedrin protein, which was obtained in Experimental Example 1, and fluorescein were added to the cell-free protein synthesis system to express the wild-type polyhedrin protein. The obtained crystals were observed. The results are shown in FIG. 7.

FIG. 7 is a fluorescence image taken by irradiating polyhedra crystals enclosing fluorescein with excitation light. As a result, it was found that polyhedra crystals enclosing fluorescein were obtained.

Experimental Example 6

(Crystallization of Mutant Polyhedrin Protein)

Four kinds of mutant polyhedrin proteins in which the amino acid sequence of L1 or a portion of L1 of the wild-type polyhedrin protein of CPV had been substituted with the following peptides, were expressed by a cell-free protein synthesis system to produce crystals. Furthermore, crystals were also produced inside capillary tubes using a smaller amount of a mutant polyhedrin protein solution.

The 70th to 77th residues of the wild-type polyhedrin protein including the amino acid sequence set forth in SEQ ID NO:1 are referred to as L1 (loop region) and including an amino acid sequence set forth in SEQ ID NO:6. The amino acid sequence in the vicinity of L1 was substituted as follows with peptides or the like as shown below.

An amino acid sequence of the 70th to 77th residues of the wild-type polyhedrin protein set forth in SEQ ID NO:1 was substituted with CLN025 peptide set forth in SEQ ID NO:7, and a mutant polyhedrin protein (ΔL1-CLN-1) set forth in SEQ ID NO:8 was designed. A schematic diagram of the three-dimensional structure of this mutant polyhedrin protein in the vicinity of the CLN025 peptide is shown in FIG. 8A.

A mutant polyhedrin protein (ΔL1-CLN-2) set forth in SEQ ID NO:9 was designed, in which two amino acid residues were added on the N-terminal side of the target peptide, and one amino acid residue was added on the C-terminal side of the target peptide in the mutant polyhedrin protein set forth in SEQ ID NO:8.

It can be said that the amino acid sequence of ΔL1-CLN-2 is an amino acid sequence obtained by substituting an amino acid sequence of the 72nd to 76th residues of the wild-type polyhedrin protein set forth in SEQ ID NO:1 with the CLN025 peptide set forth in SEQ ID NO:7.

A schematic diagram of the three-dimensional structure of this mutant polyhedrin protein in the vicinity of the CLN025 peptide is shown in FIG. 8B.

A mutant polyhedrin protein (ΔL1-CLN-3) set forth in SEQ ID NO:10 was designed, in which three amino acid residues were added on the N-terminal side of the target peptide, and three amino acid residues were added on the C-terminal side of the target peptide in the mutant polyhedrin protein set forth in SEQ ID NO:8.

It can be said that the amino acid sequence of ΔL1-CLN-3 is an amino acid sequence obtained by substituting an amino acid sequence of the 73rd and 74th residues of the wild-type polyhedrin protein set forth in SEQ ID NO:1 with the CLN025 peptide set forth in SEQ ID NO:7.

A schematic diagram of the three-dimensional structure of this mutant polyhedrin protein in the vicinity of the CLN025 peptide is shown in FIG. 8C.

A mutant polyhedrin protein (ΔL1-CLN-f) set forth in SEQ ID NO:12 was designed, in which four amino acid residues were added on the N-terminal side of the target peptide, and four amino acid residues were added on the C-terminal side of the target peptide in the mutant polyhedrin protein set forth in SEQ ID NO:8. A 4-residue peptide set forth in SEQ ID NO:13 is linked to the N-terminus and the C-terminus of CLN025 peptide. The 4-residue peptide set forth in SEQ ID NO:13 has a high degree of freedom in the three-dimensional structure.

It can be said that the amino acid sequence of ΔL1-CLN-f is an amino acid sequence obtained by substituting an amino acid sequence of the 70th to 77th residues of the wild-type polyhedrin protein set forth in SEQ ID NO:1 with a peptide including an amino acid sequence set forth in SEQ ID NO:11.

Figure 8A:
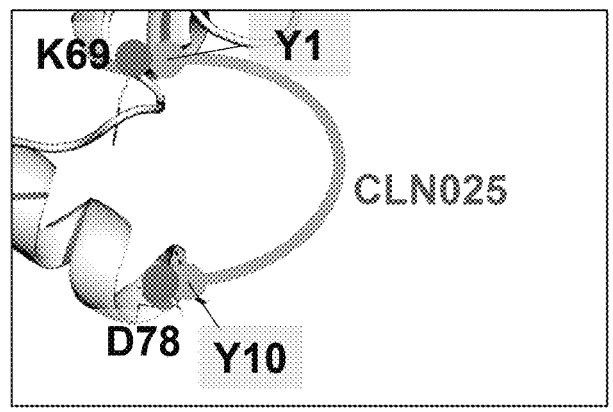
FIG. 8A is a schematic diagram of a three-dimensional structure of polyhedrin protein in the vicinity of a substituted peptide.
Figure 8B:
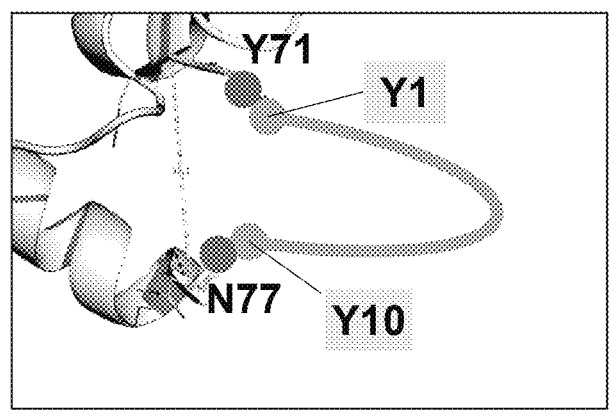
FIG. 8B is a schematic diagram of the three-dimensional structure of polyhedrin protein in the vicinity of the substituted peptide.
Figure 8C:
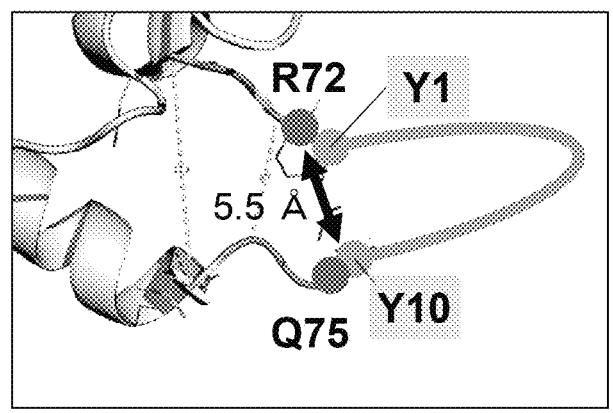
FIG. 8C is a schematic diagram of the three-dimensional structure of polyhedrin protein in the vicinity of the substituted peptide.
Figure 8D:
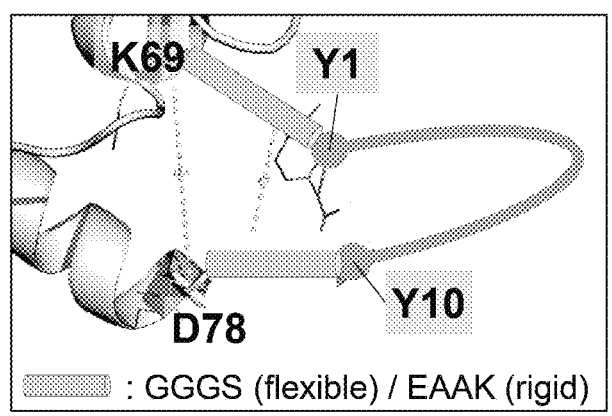
FIG. 8D is a schematic diagram of the three-dimensional structure of polyhedrin protein in the vicinity of the substituted peptide.

A schematic diagram of the three-dimensional structure of this mutant polyhedrin protein near the CLN025 peptide is shown in FIG. 8D.

A mutant polyhedrin protein (ΔL1-CLN-r) set forth in SEQ ID NO:15 was designed, in which four amino acid residues were added on the N-terminal side of the target peptide, and four amino acid residues were added on the C-terminal side of the target peptide in the mutant polyhedrin protein set forth in SEQ ID NO:8. A 4-residue peptide set forth in SEQ ID NO:16 is linked to the N-terminus and the C-terminus of CLN025 peptide. The 4-residue peptide set forth in SEQ ID NO:16 has a low degree of freedom in the three-dimensional structure.

It can be said that the amino acid sequence of ΔL1-CLN-r is an amino acid sequence obtained by substituting an amino acid sequence of the 70th to 77th residues of the wild-type polyhedrin protein set forth in SEQ ID NO:1 with a peptide including an amino acid sequence set forth in SEQ ID NO:14.

A schematic diagram of the three-dimensional structure of this mutant polyhedrin protein near the CLN025 peptide is shown in FIG. 8D.

Each of ΔL1-CLN-1, ΔL1-CLN-2, ΔL1-CLN-3, ΔL1-CLN-f, and ΔL1-CLN-r was expressed by a cell-free protein synthesis system in the same manner as in Experimental Example 1 to produce crystals, and the obtained crystals were observed. The results are shown in FIG. 9 and FIG. 10.

Figure 9:
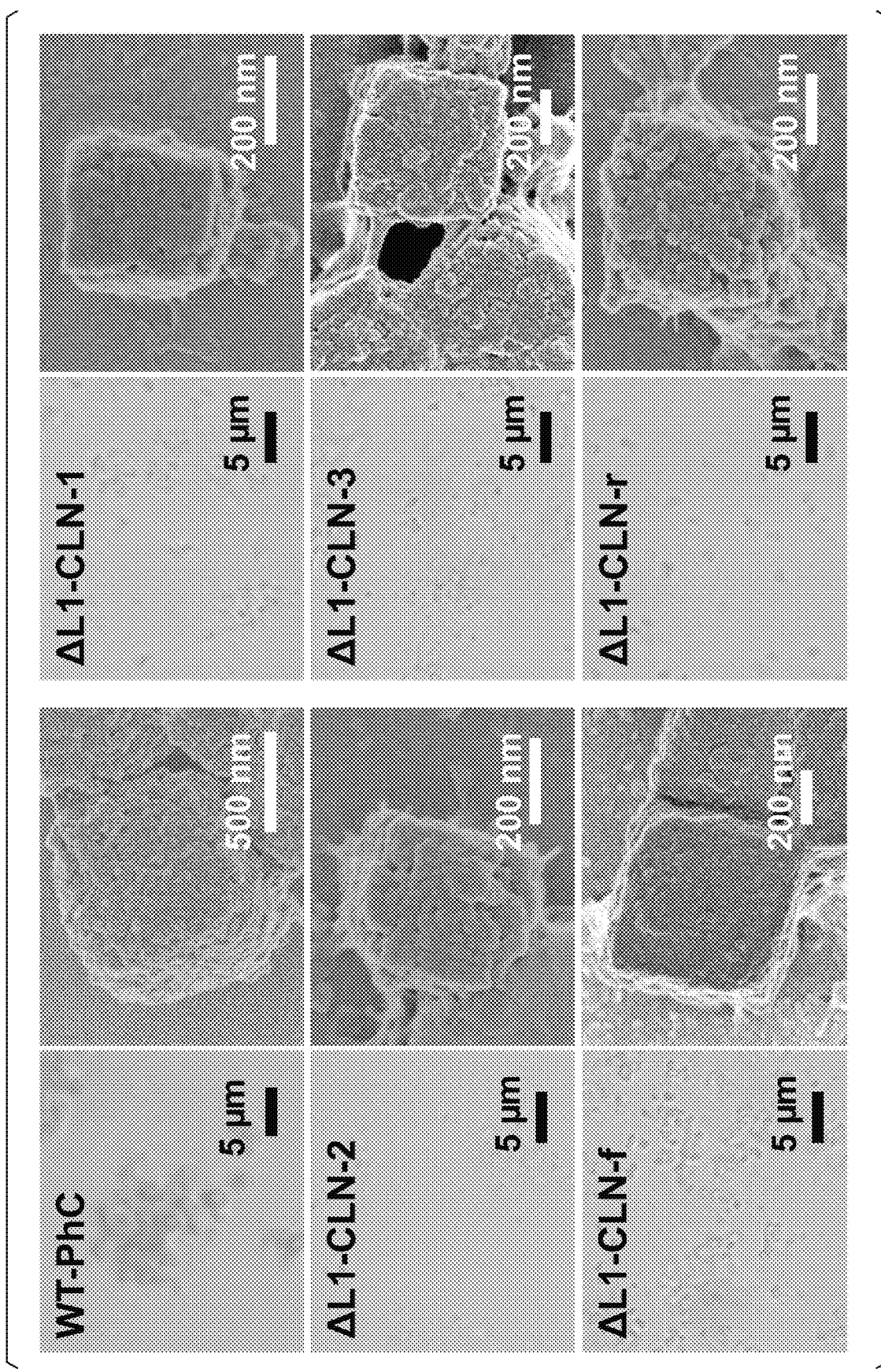
FIG. 9 is images captured by optical microscopy and images taken by SEM of a crystal formed from a mutant polyhedrin protein.

FIG. 9 is images taken by optical microscopy and images taken by SEM of the obtained crystals. As a result, crystals showing a cubic shape were obtained for all the mutant polyhedrin proteins.

Figure 10:
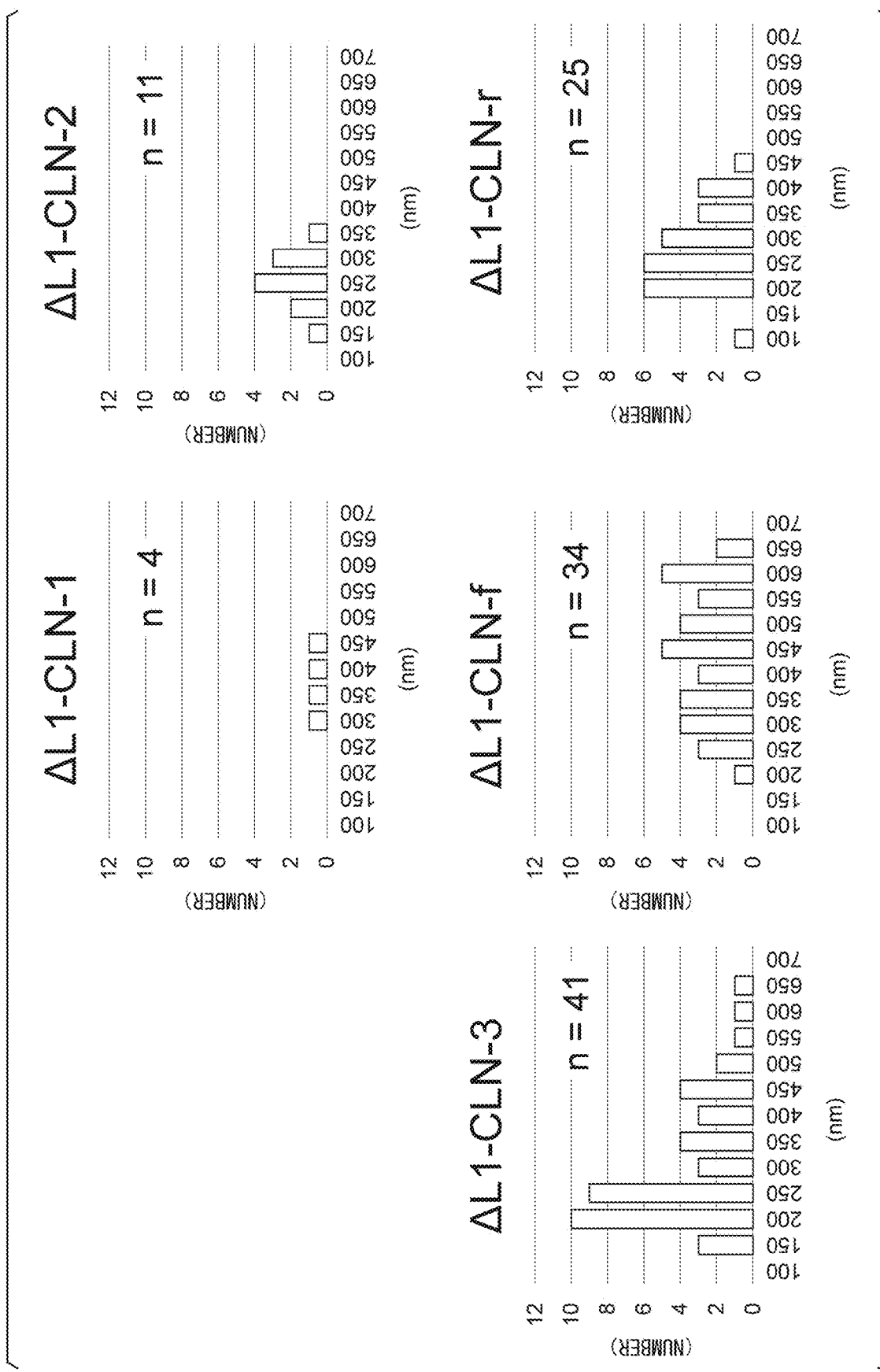
FIG. 10 is a histogram of the sizes of crystals formed from mutant polyhedrin proteins.

FIG. 10 is graphs obtained by measuring the length of one side of the obtained cubic crystals and showing the results as histograms. The average value of the length of one side of the crystals was 500 nm or less.

Furthermore, A3, which is a mutant polyhedrin protein having three amino acid residues (G192, 5193, A194) deleted, as set forth in SEQ ID NO:17, was expressed in a cell-free protein synthesis system. 18 μL of the solution of the cell-free protein synthesis system was injected into a capillary tube, and crystals were obtained. The obtained crystals were observed using a microscope.

Figure 11A:
FIG. 11A is a photograph of a capillary tube used.
Figure 11B:
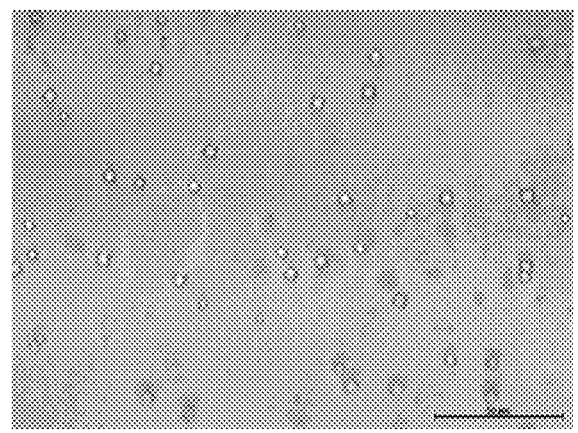
FIG. 11B shows crystals of a mutant polyhedrin protein formed in the capillary tube.

FIG. 11A is a photograph of the capillary tube used, and FIG. 11B is a bright field photographic image of the obtained crystals. When crystals are produced using a capillary tube, the crystals can be produced from a smaller amount of the reaction solution, and the crystals in the capillary tube can be efficiently utilized.

Experimental Example 7

(Identification of Mutant Polyhedrin Protein)

The crystals obtained in Experimental Example 6 were analyzed by mass spectrometry and SDS-PAGE, and it was verified whether the obtained crystals were mutant polyhedrin proteins. Furthermore, the polyhedra crystals obtained by expressing wild-type polyhedrin protein (WT-PhC) in Sf9 cells were also analyzed as a control.

Figure 12:
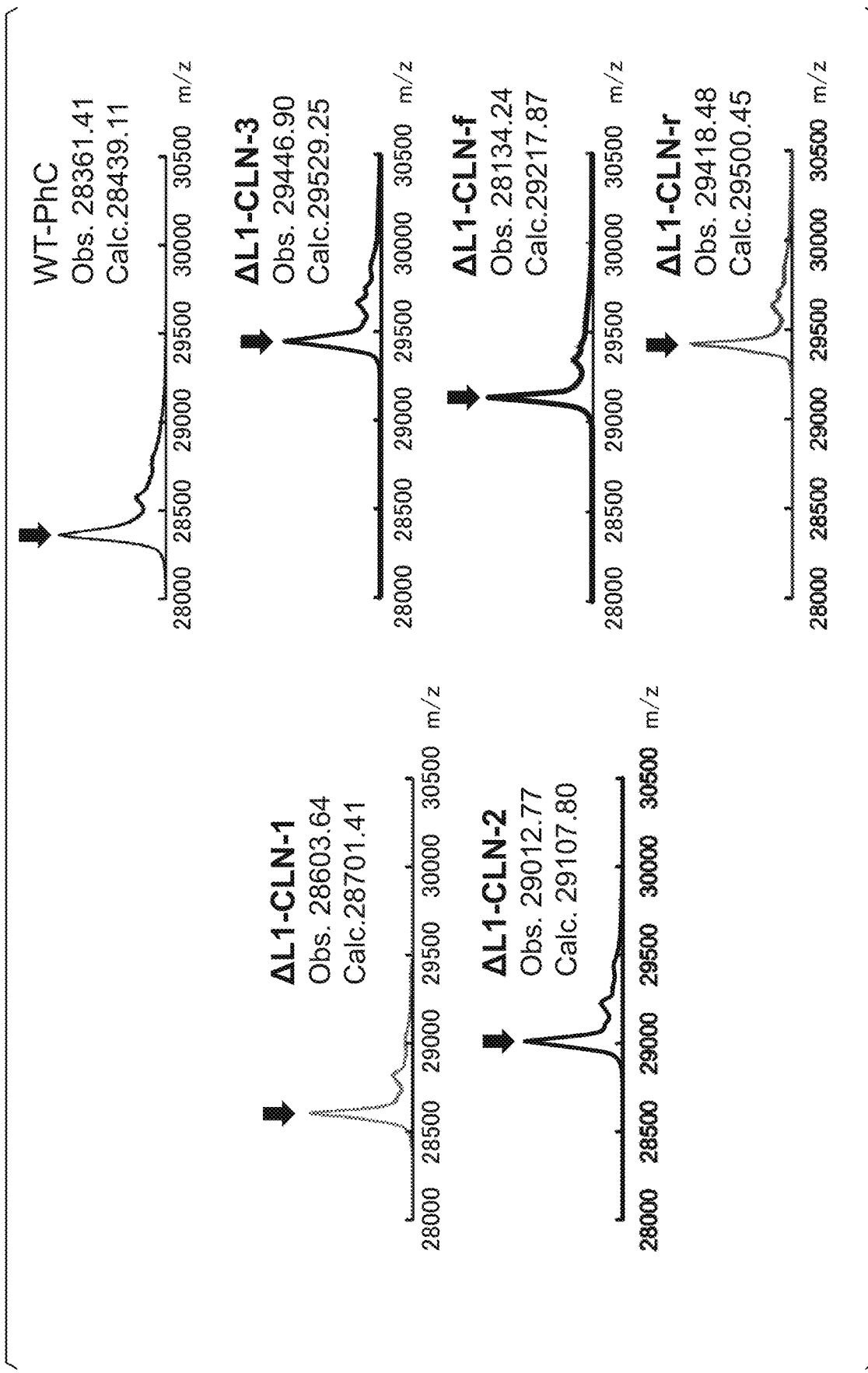
FIG. 12 shows results obtained by mass spectrometry of crystals formed from mutant polyhedrin proteins.

In mass spectrometry, the obtained crystals were analyzed by MALDI-TOF-MS. The results of mass spectrometry are shown in FIG. 12. In FIG. 12, Calc. represents the molecular weight calculated from the amino acid sequence, and Obs. indicates the mass estimated from the results of mass spectrometry. As a result, it was found that each of the obtained crystals was the mutant polyhedrin protein shown in Experimental Example 6.

Figure 13:
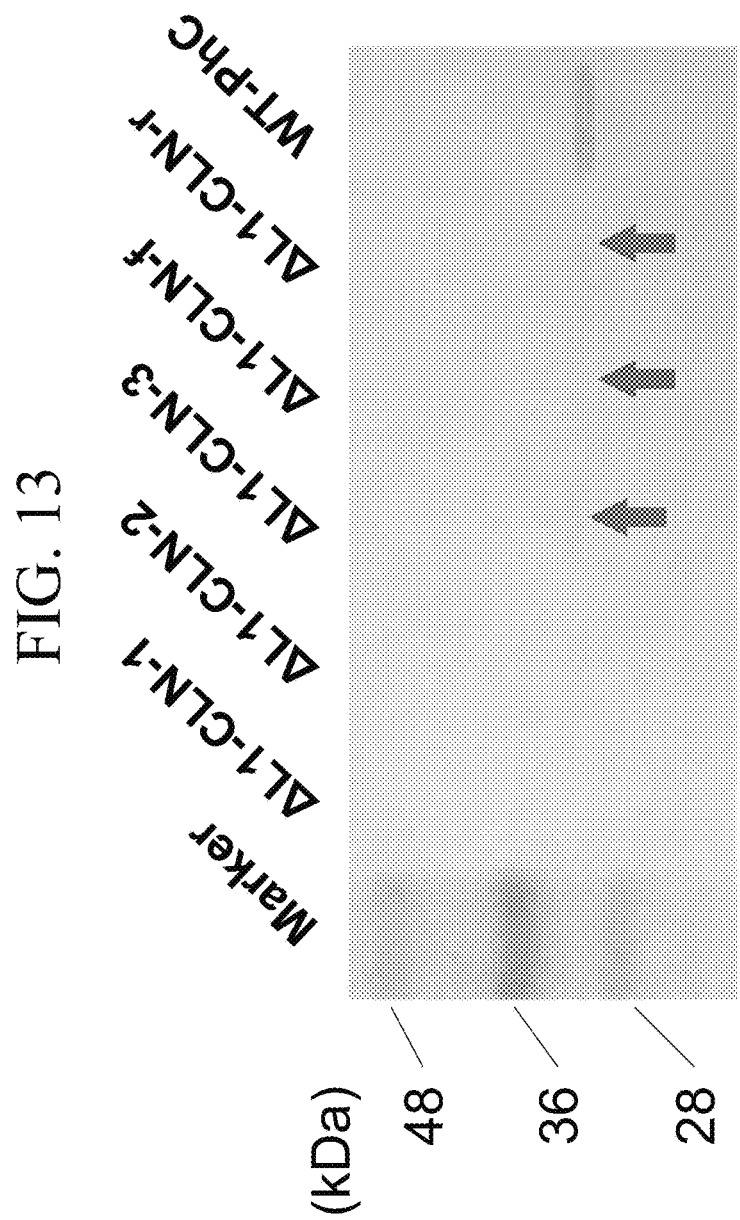
FIG. 13 shows results obtained by solubilizing crystals formed from mutant polyhedrin proteins and analyzing them by SDS-PAGE.

In SDS-PAGE, the obtained crystals were solubilized and subjected to electrophoresis. The results of SDS-PAGE are shown in FIG. 13. As a result, it was found that each of the obtained crystals was the mutant polyhedrin protein shown in Experimental Example 6.

Experimental Example 8

(X-Ray Diffraction of Mutant Polyhedrin Protein)

The crystals obtained in Experimental Example 6 were irradiated with X-rays, and X-ray diffraction was analyzed.

The solution after the translation reaction including the polyhedra crystals in Experimental Example 6 was centrifuged, and the settled crystals were introduced into a 50% PBS/ethylene glycol solution. The solution including the crystals was placed on a mesh, a large number of crystals on the mesh were irradiated with X-rays, and X-ray diffraction was observed.

As a result, when the crystals of ΔL1-CLN-3 and ΔL1-CLN-f were irradiated with X-rays, the frequency of detecting X-ray diffraction was high, and for the crystals of ΔL1-CLN-1 and ΔL1-CLN-r, X-ray diffraction was not detected. For the crystals of ΔL1-CLN-f, X-ray diffraction was detected with particularly high frequency. From these results, it was found that the crystals of ΔL1-CLN-f had a high degree of orientation. It was also suggested that structural analysis methods other than X-ray structural analysis can be applied to the crystals of ΔL1-CLN-f.

Experimental Example 9

(Crystallization of Cry3A Protein)

Cry3A protein set forth in SEQ ID NO:18 was expressed in the same manner as in Experimental Example 1 using a wheat germ cell-free protein synthesis system, and the obtained protein solution was maintained at 4° C. or 20° C. to form crystals. The obtained crystals were observed by optical microscopy or scanning electron microscopy.

Figure 14A:
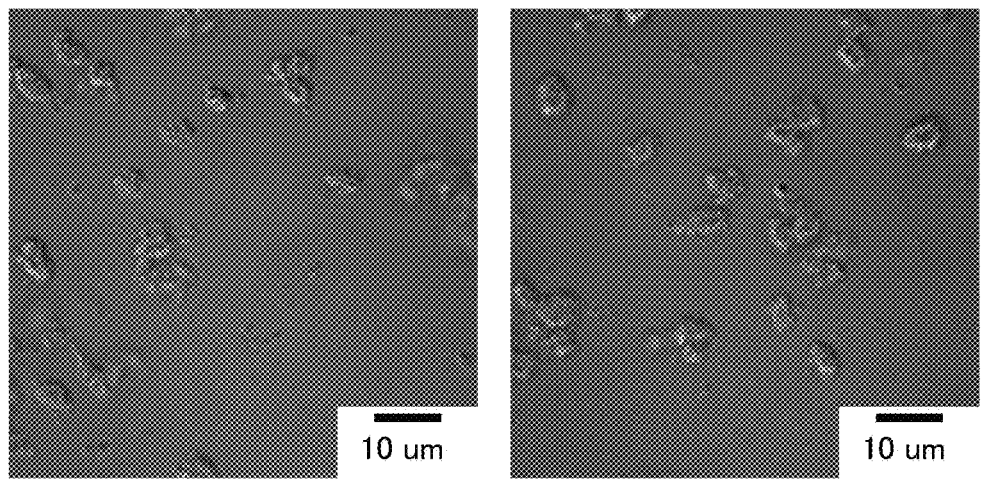
FIG. 14A is optical microscopic images of Cry3A protein crystals produced at 20° C.
Figure 14B:
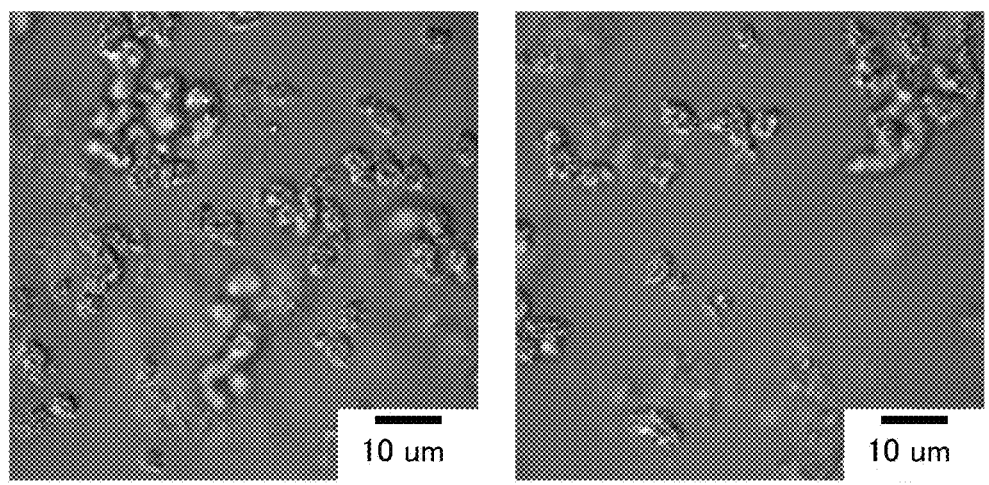
FIG. 14B is optical microscopic images of Cry3A protein crystals produced at 4° C.
Figure 14C:
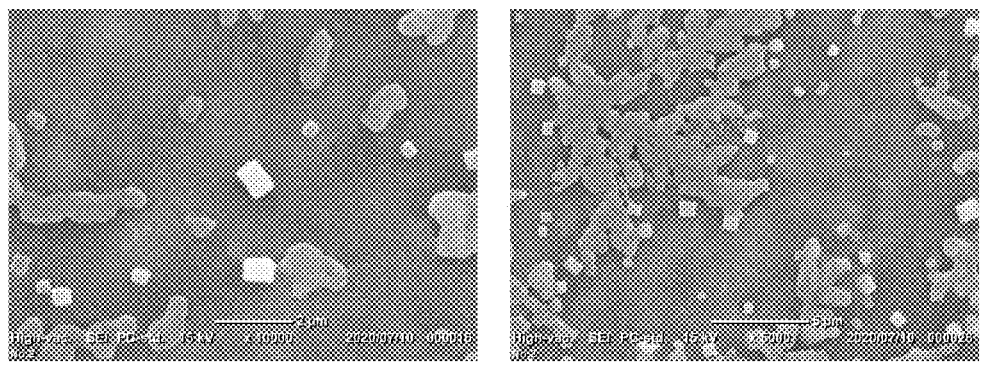
FIG. 14C is SEM images of Cry3A protein crystals produced at 20° C.
Figure 14D:
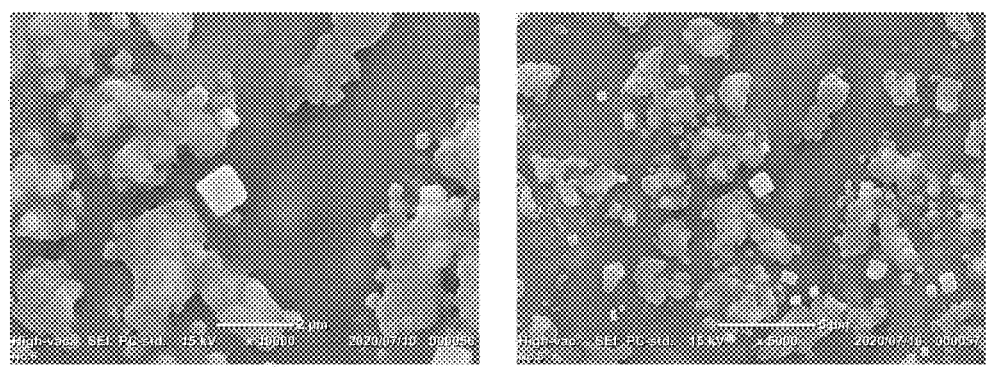
FIG. 14D is SEM images of Cry3A protein crystals produced at 4° C.

FIG. 14A is optical microscopic images of crystals produced at 20° C., and FIG. 14B is optical microscopic images of crystals produced at 4° C. FIG. 14C is SEM images of crystals produced at 20° C., and FIG. 14D is SEM images of crystals produced at 4° C. It was found that crystals of Cry3A were obtained in the same manner as in the case of the above-mentioned polyhedrin protein in Experimental Example 1.

Experimental Example 10

(Crystallization of μNS Protein)

μNS protein set forth in SEQ ID NO:22 was expressed in the same manner as in Experimental Example 1 using a wheat germ cell-free protein synthesis system, and the obtained protein solution was maintained at 4° C. or 20° C. to form crystals. The obtained crystals were observed by optical microscopy or electron microscopy.

Figure 15A:
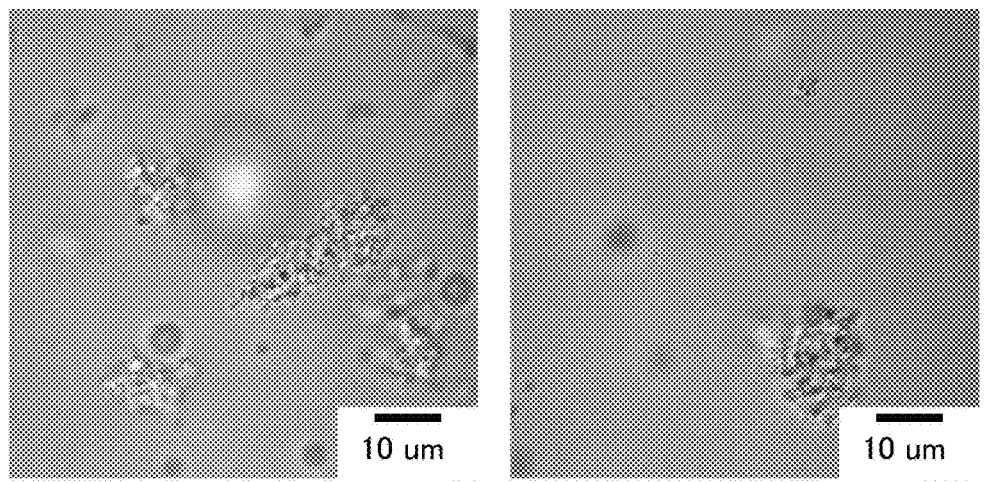
FIG. 15A is optical microscopic images of μNS protein crystals produced at 20° C.
Figure 15B:
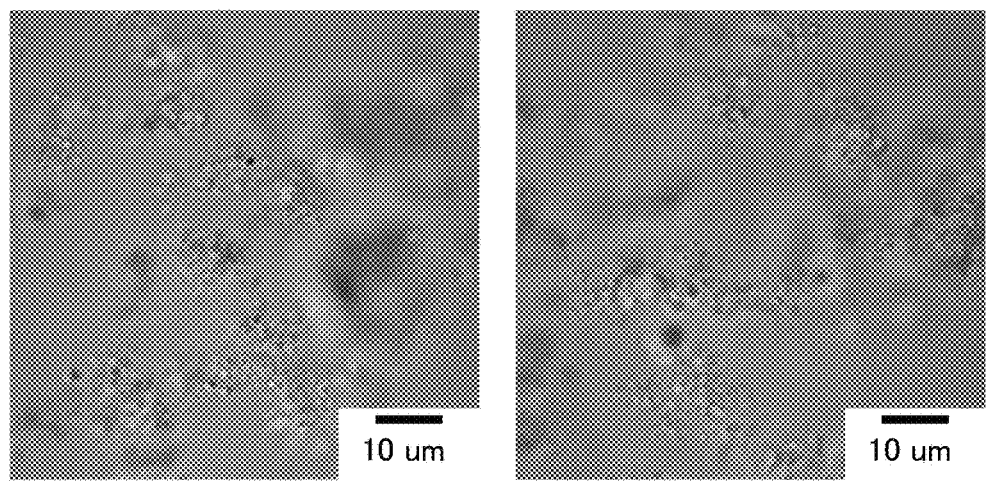
FIG. 15B is optical microscopic images of μNS protein crystals produced at 4° C.
Figure 15C:
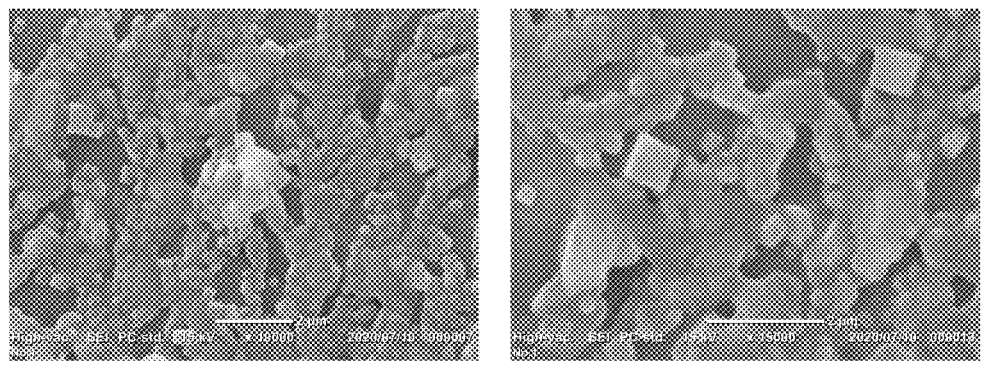
FIG. 15C is SEM images of μNS protein crystals produced at 20° C.
Figure 15D:
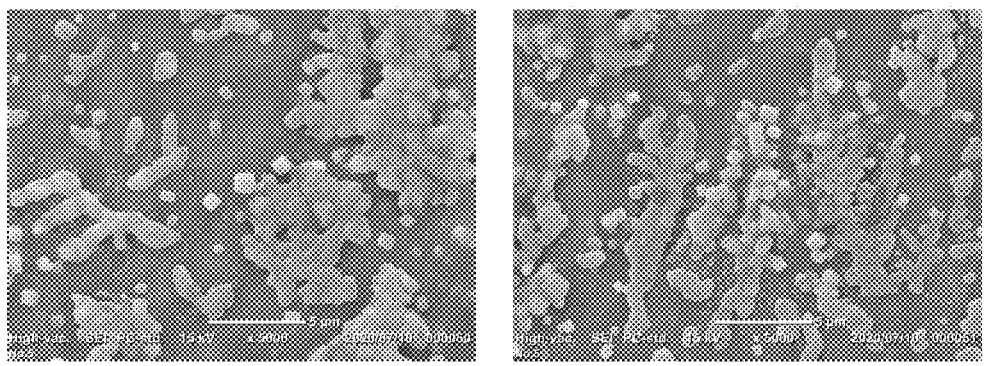
FIG. 15D is SEM images of μNS protein crystals produced at 4° C.

FIG. 15A is optical microscopic images of crystals produced at 20° C., and FIG. 15B is optical microscopic images of crystals produced at 4° C. FIG. 15C is SEM images of crystals produced at 20° C., and FIG. 15D is SEM images of crystals produced at 4° C. It was found that crystals of μNS protein were obtained in the same manner as in the case of the above-mentioned polyhedrin protein in Experimental Example 1.

Experimental Example 11

(Crystallization of Cathepsin B Protein)

Cathepsin B protein set forth in SEQ ID NO:19 was expressed in the same manner as in Experimental Example 1 using a wheat germ cell-free protein synthesis system, and the obtained protein solution was maintained at 4° C. or 20° C. to form crystals. The obtained crystals were observed by optical microscopy or electron microscopy.

Figure 16A:
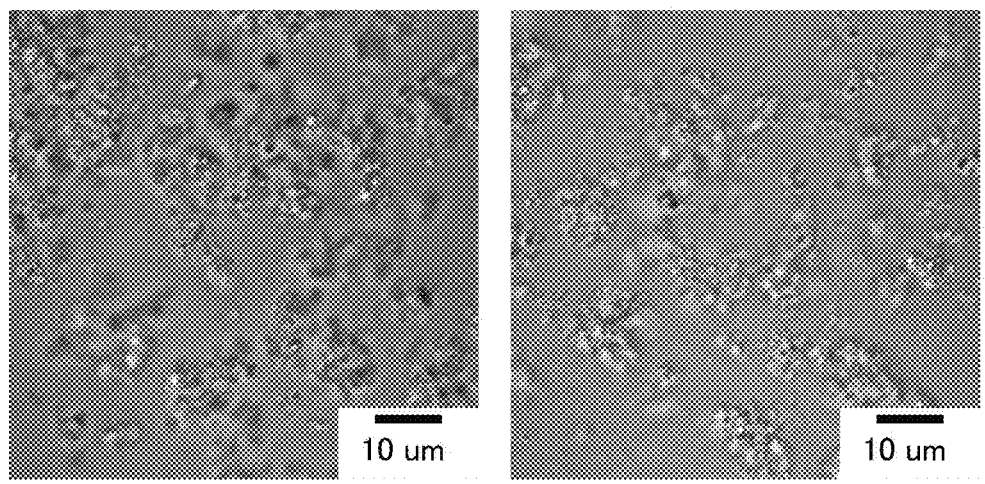
FIG. 16A is optical microscopic images of cathepsin B protein crystals produced at 20° C.
Figure 16B:
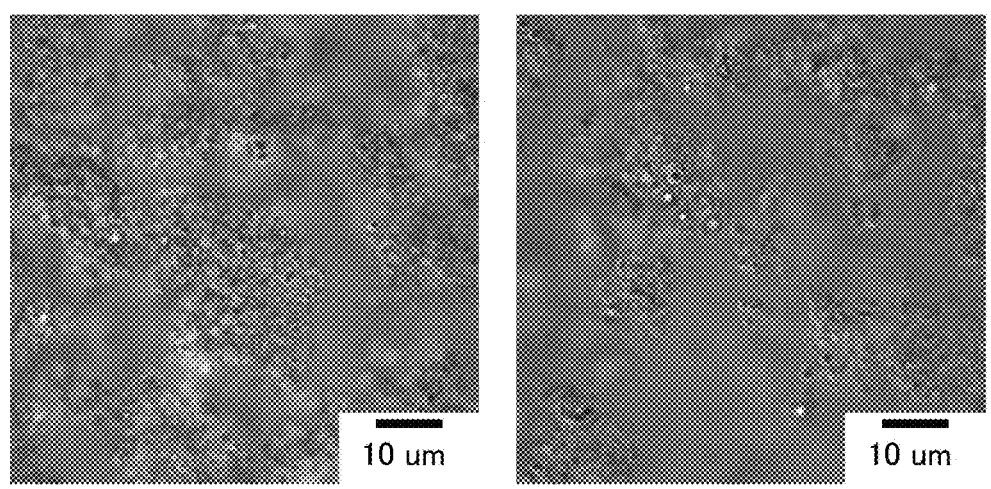
FIG. 16B is optical microscopic images of cathepsin B protein crystals produced at 4° C.
Figure 16C:
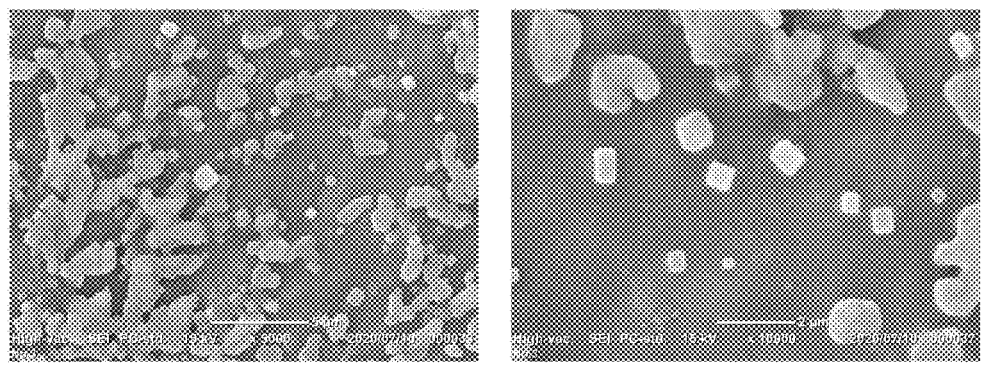
FIG. 16C is SEM images of cathepsin B protein crystals produced at 20° C.
Figure 16D:
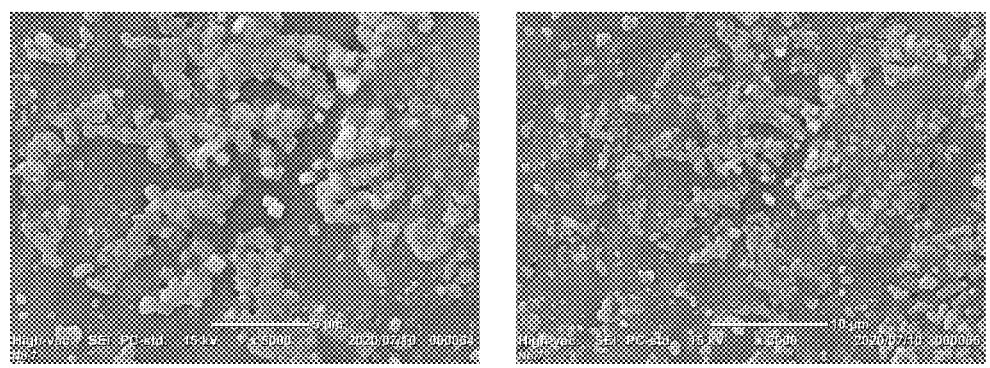
FIG. 16D is SEM images of cathepsin B protein crystals produced at 4° C.

FIG. 16A is optical microscopic images of crystals produced at 20° C., and FIG. 16B is optical microscopic images of crystals produced at 4° C. FIG. 16C is SEM images of crystals produced at 20° C., and FIG. 16D is SEM images of crystals produced at 4° C. It was found that crystals of cathepsin B protein were obtained in the same manner as in the case of the above-mentioned polyhedrin protein in Experimental Example 1.

Experimental Example 12

(Crystallization of Nuclear Polyhedral Protein)

Nuclear polyhedral protein set forth in SEQ ID NO:2 was expressed in the same manner as in Experimental Example 1 using a wheat germ cell-free protein synthesis system, and the obtained protein solution was maintained at 4° C. or 20° C. to form crystals. The obtained crystals were observed by optical microscopy or electron microscopy.

Figure 17A:
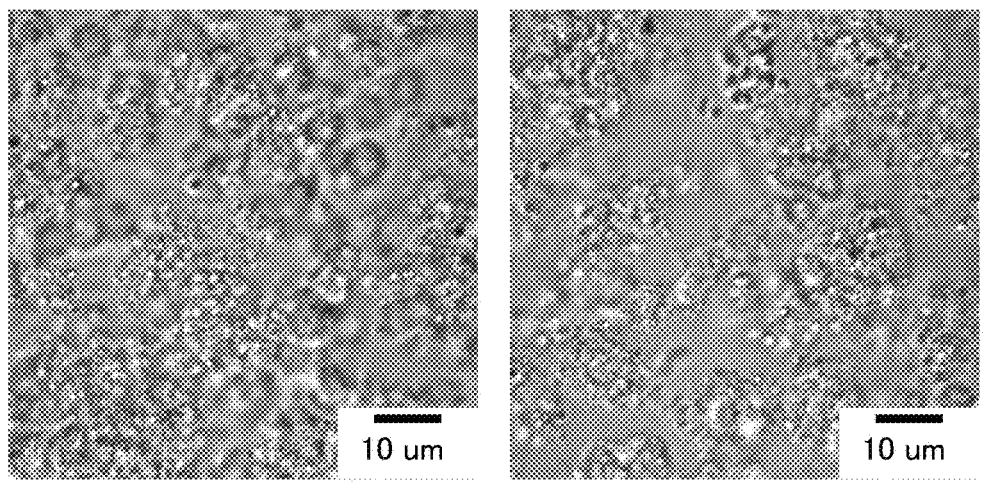
FIG. 17A is optical microscopic images of nuclear polyhedral protein crystals produced at 20° C.
Figure 17B:
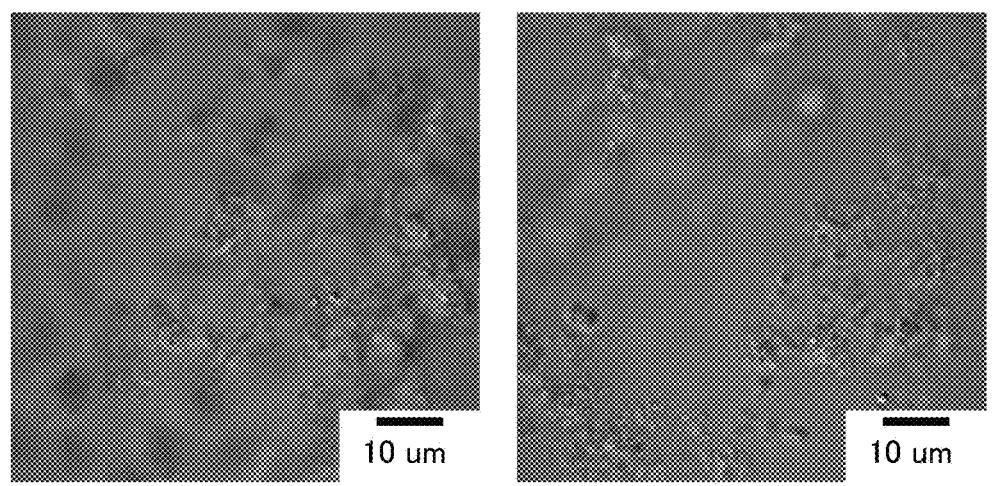
FIG. 17B is optical microscopic images of nuclear polyhedral protein crystals produced at 4° C.
Figure 17C:
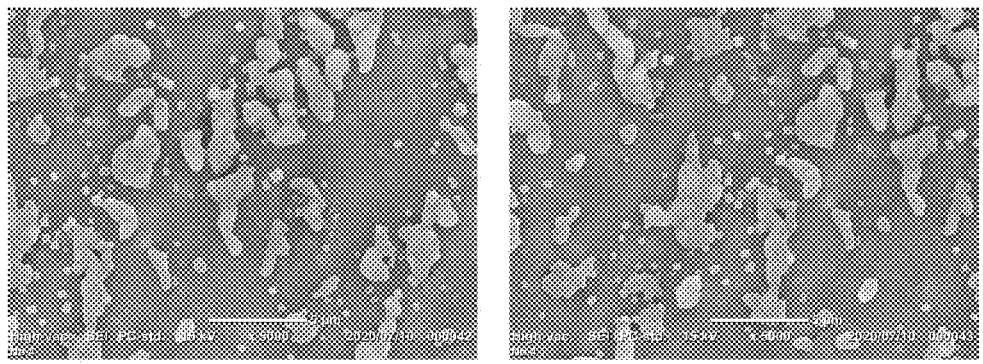
FIG. 17C is SEM images of nuclear polyhedral protein crystals produced at 20° C.
Figure 17D:
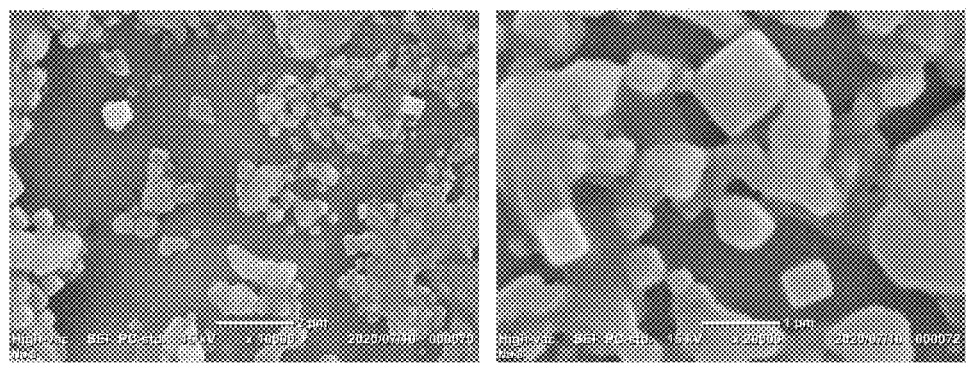
FIG. 17D is SEM images of nuclear polyhedral protein crystals produced at 4° C.

FIG. 17A is optical microscopic images of crystals produced at 20° C., and FIG. 17B is optical microscopic images of crystals produced at 4° C. FIG. 17C is SEM images of crystals produced at 20° C., and FIG. 17D is SEM images of crystals produced at 4° C. It was found that crystals of the nuclear polyhedral protein were obtained in the same manner as in the case of the above-mentioned polyhedrin protein in Experimental Example 1.

Experimental Example 13

(Crystallization of CipA)

CipA set forth in SEQ ID NO:24 was expressed in the same manner as in Experimental Example 1 using a wheat germ cell-free protein synthesis system, and the obtained protein solution was maintained at 20° C. to form crystals. The obtained crystals were observed by optical microscopy.

Figure 18:
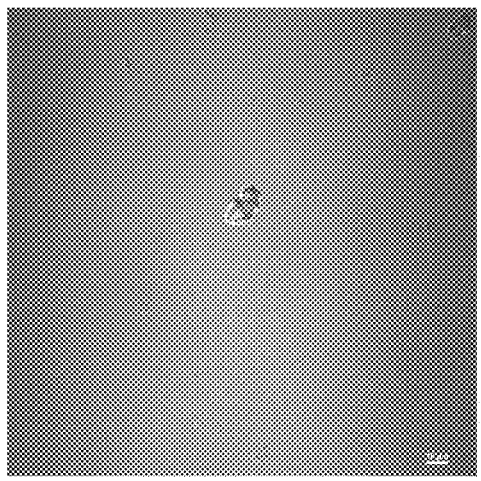
FIG. 18 is optical microscopic images of CipA protein crystals produced at 20° C.
Figure 18:
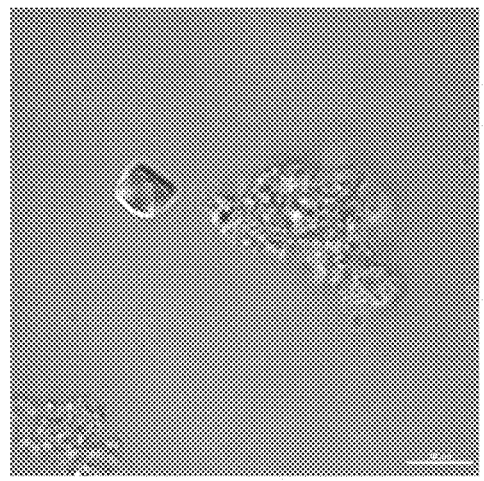

FIG. 18 is optical microscopic images of the crystals produced at 20° C. It was found that crystals of CipA were obtained in the same manner as in the case of the above-mentioned polyhedrin protein in Experimental Example 1.

INDUSTRIAL APPLICABILITY

According to the present invention, a technology for obtaining protein crystals in a short period of time with less efforts can be provided.

SEQUENCE LISTING

PC30144_Sequence table.txt

---

The invention claimed is:

1. A method for producing a protein crystal, the method comprising:
- step (a) of adding a nucleic acid encoding a crystalline protein to a protein synthesis system;
- step (b) of incubating the protein synthesis system for a predetermined time until the crystalline protein encoded by the added nucleic acid is expressed and the expressed crystalline protein completes the formation of crystals; and
- step (c) of obtaining the crystals,
- wherein the protein synthesis system is a cell-free protein synthesis system,
- the predetermined time in step (b) is 64 hours or less,
- the temperature of the protein synthesis system is 10° C. or higher, and
- the crystalline protein is one selected from the group consisting of the following (i) to (viii):
  - (i) a protein comprising the amino acid sequence set forth in SEQ ID NO:1, or a protein comprising an amino acid sequence in which 1 to 50 amino acids have been deleted, substituted, or added in the amino acid sequence set forth in SEQ ID NO: 1, the protein having a polyhedron-forming ability;
  - (ii) a protein comprising the amino acid sequence set forth in SEQ ID NO:2, or a protein comprising an amino acid sequence in which 1 to 50 amino acids have been deleted, substituted, or added in the amino acid sequence set forth in SEQ ID NO:2, the protein having a polyhedron-forming ability;
  - (iii) a protein comprising the amino acid sequence set forth in SEQ ID NO:18, or a protein comprising an amino acid sequence in which 1 to 50 amino acids have been deleted, substituted, or added in the amino acid sequence set forth in SEQ ID NO: 18, the protein having a crystal-forming ability;
  - (iv) a protein comprising the amino acid sequence set forth in SEQ ID NO:19, or a protein comprising an amino acid sequence in which 1 to 50 amino acids have been deleted, substituted, or added in the amino acid sequence set forth in SEQ ID NO: 19, the protein having a crystal-forming ability;
  - (v) a protein comprising the amino acid sequence set forth in SEQ ID NO:22, or a protein comprising an amino acid sequence in which 1 to 50 amino acids have been deleted, substituted, or added in the amino acid sequence set forth in SEQ ID NO:22, the protein having a crystal-forming ability;
  - (vi) a protein comprising the amino acid sequence set forth in SEQ ID NO:24, or a protein comprising an amino acid sequence in which 1 to 20 amino acids have been deleted, substituted, or added in the amino acid sequence set forth in SEQ ID NO:24, the protein having a crystal-forming ability;
  - (vii) a fusion protein comprising a protein selected from any one of (i) to (vi) and a target peptide, the fusion protein having a crystal-forming ability; and
  - (viii) a fusion protein comprising the amino acid sequence set forth in SEQ ID NO:1, wherein the 70th amino acid to the 77th amino acid of the amino acid sequence has been substituted with a target peptide, and/or wherein 1 to 50 amino acids have been deleted, substituted, or added in the fusion protein, the fusion protein having a polyhedron-forming ability.

2. The method for producing a protein crystal according to claim 1, wherein the crystalline protein is (i) or (viii), and wherein a second nucleic acid is added to the protein synthesis system in step (a), the second nucleic acid encoding a fusion protein in which a target peptide is bonded to the C-terminus of the amino acid sequence set forth in SEQ ID NO:4 or to the C-terminus of an amino acid sequence in which 1 to 10 amino acids have been deleted, substituted, or added in the amino acid sequence set forth in SEQ ID NO:4.

3. The method for producing a protein crystal according to claim 1, wherein the cell-free protein synthesis system includes a target molecule having a molecular weight of 10 to 100,000 daltons.

4. The method according to claim 1, wherein a three-dimensional structure of the protein crystal produced by the method is essentially the same as a three-dimensional structure of the protein when crystallized intracellularly, as analyzed by X-ray structural analysis.

5. The method according to claim 4, wherein the X-ray structural analysis is set to a resolution of 1.7 Å.

* * * * *